(12) United States Patent
Maturi et al.

(10) Patent No.: US 7,606,248 B1
(45) Date of Patent: Oct. 20, 2009

(54) METHOD AND APPARATUS FOR USING MULTIPLE NETWORK PROCESSORS TO ACHIEVE HIGHER PERFORMANCE NETWORKING APPLICATIONS

(75) Inventors: Greg Maturi, San Jose, CA (US); Neil Mammen, San Jose, CA (US); Sagar Edara, San Jose, CA (US); Mammen Thomas, San Jose, CA (US)

(73) Assignee: Altera Corporation, San Jose, CA (US)

( * ) Notice: Subject to any disclaimer, the term of this patent is extended or adjusted under 35 U.S.C. 154(b) by 586 days.

(21) Appl. No.: 10/144,387

(22) Filed: May 10, 2002

(51) Int. Cl.
  *H04L 12/56* (2006.01)
(52) U.S. Cl. ........................ 370/412; 370/474
(58) Field of Classification Search .................
  370/395.31–395.32, 395.43, 412–413, 417–418, 370/392, 395.1, 474
  See application file for complete search history.

(56) References Cited

U.S. PATENT DOCUMENTS

| | | |
|---|---|---|
| 4,710,966 A | 12/1987 | Aufiero et al. |
| 4,893,302 A | 1/1990 | Hemmady et al. |
| 5,257,395 A | 10/1993 | Li |
| 5,398,315 A | 3/1995 | Johnson et al. |
| 5,400,288 A | 3/1995 | Hashimoto et al. |
| 5,541,852 A | 7/1996 | Eyuboglu et al. |
| 5,598,408 A | 1/1997 | Nickolls et al. |
| 5,696,719 A | 12/1997 | Baek et al. |
| 5,715,437 A | 2/1998 | Baker et al. |
| 5,742,180 A | 4/1998 | Dehon et al. |
| 5,796,719 A | 8/1998 | Peris et al. |
| 5,805,816 A | 9/1998 | Picazo et al. |
| 5,831,971 A | 11/1998 | Bonomi et al. |
| 5,898,689 A | 4/1999 | Kumar et al. |
| 6,018,612 A | 1/2000 | Thomason et al. |
| 6,047,304 A | 4/2000 | Ladwig et al. |
| 6,163,359 A | 12/2000 | Alexander et al. |
| 6,226,338 B1 | 5/2001 | Earnest |

(Continued)

FOREIGN PATENT DOCUMENTS

EP 1061764 A2 * 12/2000

(Continued)

OTHER PUBLICATIONS

Building a robust software-based router using network processors; ACM Symposium on Operating Systems Principles archive Proceedings of the eighteenth ACM symposium on Operating systems principles table of contents; Banff, Alberta, Canada Session: Event-driven architectures table of contents; pp. 216-229; Year of Publication: 2001.*

(Continued)

*Primary Examiner*—Hassan Kizou
*Assistant Examiner*—Salman Ahmed
(74) *Attorney, Agent, or Firm*—Martine Penilla & Gencarella, LLP

(57) ABSTRACT

An apparatus is described having a plurality of network processors that identify, for each of a plurality of packets, which multidimensional queue from amongst a plurality of multidimensional queues that each one of the plurality of packets should be enqueued into. Each of the network processors is able to identify a particular multidimensional queue for a different one of the plurality of packets.

54 Claims, 9 Drawing Sheets

U.S. PATENT DOCUMENTS

| | | | |
|---|---|---|---|
| 6,275,507 | B1 | 8/2001 | Anderson et al. |
| 6,377,071 | B1 | 4/2002 | Wang et al. |
| 6,377,546 | B1 | 4/2002 | Guerin et al. |
| 6,377,587 | B1 | 4/2002 | Grivan |
| 6,389,468 | B1 | 5/2002 | Muller et al. |
| 6,438,145 | B1 | 8/2002 | Movshovich et al. |
| 6,487,202 | B1 | 11/2002 | Klausmeier et al. |
| 6,721,271 | B1 | 4/2004 | Beshai et al. |
| 6,738,880 | B2 | 5/2004 | Lai et al. |
| 6,757,897 | B1 | 6/2004 | Shi et al. |
| 6,782,470 | B1 | 8/2004 | Berg et al. |
| 6,804,815 | B1 | 10/2004 | Kerr et al. |
| 6,823,409 | B2 | 11/2004 | Jones et al. |
| 6,910,092 | B2 | 6/2005 | Calvignac et al. |
| 6,915,480 | B2 | 7/2005 | Calle et al. |
| 6,973,036 | B2 | 12/2005 | Goetzinger et al. |
| 6,982,986 | B2 | 1/2006 | Goetzinger et al. |
| 6,985,964 | B1 | 1/2006 | Petersen et al. |
| 6,987,760 | B2 | 1/2006 | Calvignac et al. |
| 7,002,965 | B1 | 2/2006 | Cheriton |
| 7,110,400 | B2 | 9/2006 | Hronik |
| 7,206,857 | B1 | 4/2007 | Mammen et al. |
| 2001/0049744 | A1 | 12/2001 | Hussey et al. |
| 2002/0044559 | A1 | 4/2002 | Ardalan et al. |
| 2002/0048270 | A1* | 4/2002 | Allen et al. ............... 370/392 |
| 2002/0050959 | A1 | 5/2002 | Buckelew et al. |
| 2002/0071321 | A1* | 6/2002 | Barri et al. ............... 365/200 |
| 2002/0078196 | A1* | 6/2002 | Kim et al. ............... 709/224 |
| 2002/0099900 | A1 | 7/2002 | Kawarai et al. |
| 2002/0101867 | A1 | 8/2002 | O'Callaghan et al. |
| 2002/0122386 | A1* | 9/2002 | Calvignac et al. ......... 370/230 |
| 2002/0122424 | A1 | 9/2002 | Kawarai et al. |
| 2002/0126672 | A1 | 9/2002 | Chow et al. |
| 2002/0126710 | A1 | 9/2002 | Bergenwall et al. |
| 2002/0145974 | A1 | 10/2002 | Saidi et al. |
| 2002/0161969 | A1* | 10/2002 | Nataraj et al. ............... 711/108 |
| 2002/0163935 | A1 | 11/2002 | Paatela et al. |
| 2002/0169921 | A1 | 11/2002 | Saitoh |
| 2002/0191642 | A1* | 12/2002 | Calvignac et al. ......... 370/474 |
| 2003/0012209 | A1* | 1/2003 | Abdelilah et al. ......... 370/412 |
| 2003/0053460 | A1 | 3/2003 | Suda et al. |
| 2003/0063348 | A1 | 4/2003 | Posey et al. |
| 2003/0067930 | A1* | 4/2003 | Salapura et al. ............ 370/412 |
| 2003/0088671 | A1 | 5/2003 | Klinker et al. |
| 2003/0091036 | A1* | 5/2003 | Milliken et al. ............ 370/354 |
| 2003/0099194 | A1 | 5/2003 | Lee et al. |
| 2003/0103507 | A1 | 6/2003 | Lynch et al. |
| 2003/0112802 | A1 | 6/2003 | Ono et al. |
| 2003/0189932 | A1 | 10/2003 | Ishikawa et al. |
| 2003/0193936 | A1* | 10/2003 | Wolrich et al. ............ 370/360 |
| 2003/0214948 | A1 | 11/2003 | Jin et al. |
| 2004/0030770 | A1* | 2/2004 | Pandya ....................... 709/223 |
| 2004/0066804 | A1 | 4/2004 | Holma |
| 2005/0025140 | A1* | 2/2005 | Deforche et al. ........... 370/363 |
| 2005/0060428 | A1* | 3/2005 | Corl et al. .................. 709/240 |
| 2007/0133538 | A1* | 6/2007 | Han et al. ................... 370/392 |
| 2008/0112415 | A1* | 5/2008 | Sobaje ....................... 370/392 |
| 2008/0298244 | A1* | 12/2008 | Corl et al. .................. 370/235 |

FOREIGN PATENT DOCUMENTS

| | | |
|---|---|---|
| WO | WO 99/13397 | 3/1999 |

OTHER PUBLICATIONS

Technologies and building blocks for fast forwarding; Bux, W. Denzel, W.E. Engbersen, T. Herkersdorf, A. Luijten, R.P. IBM Res. Div., Zurich; This paper appears in: Communications Magazine, IEEE; Publication Date: Jan. 2001 vol. 39, Issue: 1; On pp. 70-77.*

A network processor architecture for flexible QoS control in veryhigh-speed line interfaces; Shimonishi, H. Murase, T. Comput. & Commun. Media Res., NEC Corp.; This paper appears in: High Performance Switching and Routing, 2001 IEEE Workshop on Publication Date: 2001; On pp. 402-406; Meeting Date: May 29-31, 2001.*

Characterizing processor architectures for programmable network interfaces; International Conference on Supercomputing archive; Proceedings of the 14th international conference on Supercomputing table of contents; Santa Fe, New Mexico, United States; pp. 54-65; Year of Publication: 2000.*

U.S. Appl. No. 10/144,091, filed May 10, 2002, Maturi et al.
U.S. Appl. No. 10/153,137, filed May 20, 2002, Mammen et al.
U.S. Appl. No. 10/144,092, filed May 10, 2002, Maturi et al.
U.S. Appl. No. 10/151,774, filed May 20, 2002, Mammen et al.
U.S. Appl. No. 10/151,775, filed May 20, 2002, Mammen et al.

\* cited by examiner

US 7,606,248 B1

METHOD AND APPARATUS FOR USING MULTIPLE NETWORK PROCESSORS TO ACHIEVE HIGHER PERFORMANCE NETWORKING APPLICATIONS

FIELD OF INVENTION

The field of invention relates generally to networking; and, more specifically, to a method and apparatus for using multiple network processors to achieve higher performance networking applications.

BACKGROUND

A depiction of a network processing core 112 is shown in FIG. 1. A network processing core 112 is a circuit having a network processor 101 that is coupled to a data storage device (such as look-up resource 103 and memory unit 105). Network processors have received widespread attention recently because they integrate, onto a single semiconductor chip, circuitry that helps perform basic networking tasks. One basic networking task that a network processor 101 is commonly designed to help perform is a "look-up" based upon a packet's header information. The look up is typically performed to retrieve information that indicates how the packet is to be treated and/or classified.

For example, after a packet header or a portion of a portion of a packet header (either of which may be referred to as a header information unit or unit of header information) is presented to the network processor 101 at its input 102, the network processor 101 is responsible for understanding the organization of the header information unit so that at least a portion of it (e.g., its source address, its source port, its destination address, its destination port, a connection identifier, a classification identifier, some combination of any or all of these, etc.) can be used as a basis for performing a look-up. In various embodiments, a search key is formed by the network processor 101 from the header information unit. The search key, which acts as a look-up input parameter, is then presented to a look-up resource 103.

The look-up resource 103 stores information that is used by the network processor 101 to help "classify" the packet that the header information unit corresponds to. The look-up resource 103 can be implemented with a content addressable memory (CAM); and/or, a traditional memory such as a Static Random Access Memory (SRAM) or Dynamic Random Access Memory (DRAM). The look-up process may be performed, for each header information unit, with a single look-up (where the classification information is retrieved as an immediate response to the search key); or, alternatively a series of look-ups (e.g., a first look-up is performed from the search key to retrieve a reference value which; in turn, is used as a look-up parameter for a second look-up that produces the classification information).

According to at least one approach, the classification information that is obtained in response to the look-up performed by the network processor 101 is used by the network processor 101 to help treat the packet in an appropriate fashion. For example, the retrieved classification information may correspond to a "queue identifier" (or other form of information) that identifies (or helps to identify) a particular queue out of a plurality of queues that exist within memory unit 105. Memory unit 105 is typically implemented with SRAM or DRAM type memory. Here, the association of a particular packet with a particular queue serves as a vehicle for treating the packet in an appropriate fashion because differing amounts of delay are associated amongst the various queues that reside within the memory unit 105.

For example, differing rates of queue service may be implemented amongst the queues in order to implement "differentiated services" across the spectrum of packets that are presented to the network processor 101. For example, packets that should experience reduced latency (e.g., packets associated with a real time application such as a voice conversation or a video conference) may be placed into a queue that receives a high bandwidth rate of service (and therefore imposes reduced delay); and, packets that can experience a greater amount of latency (e.g., packets associated with a traditional data communication such as an email or a file transfer) may be placed into a queue that receives a low bandwidth rate of service (and therefore may impose extended periods of delay).

Once an appropriate time arises for a packet (or portion thereof) to be removed from its queue within the memory unit 105 (e.g., so that it can be transmitted onto an egress networking line or forwarded to a switching plane for transfer to another line interface card), it is read from memory unit 105 and is presented at the processor output 106 for downstream handling. Note that, in order to support this functionality, the network processor 101 can be designed to not only recognize that a plurality of queues exist within memory unit 105 but also determine when a packet (or portion thereof) is to be removed from the memory unit 105 (e.g., by not only recognizing where the different queues within memory unit 105 reside but also by implementing the particular service rates applied to each).

Here, note that the management and implementation of the queues within memory unit 105 may be viewed as a second basic networking task that the networking processor 101 is typically designed to help perform.

FIGURES

The present invention is illustrated by way of example, and not limitation, in the Figures of the accompanying drawings in which.

DETAILED DESCRIPTION

Figure 1:
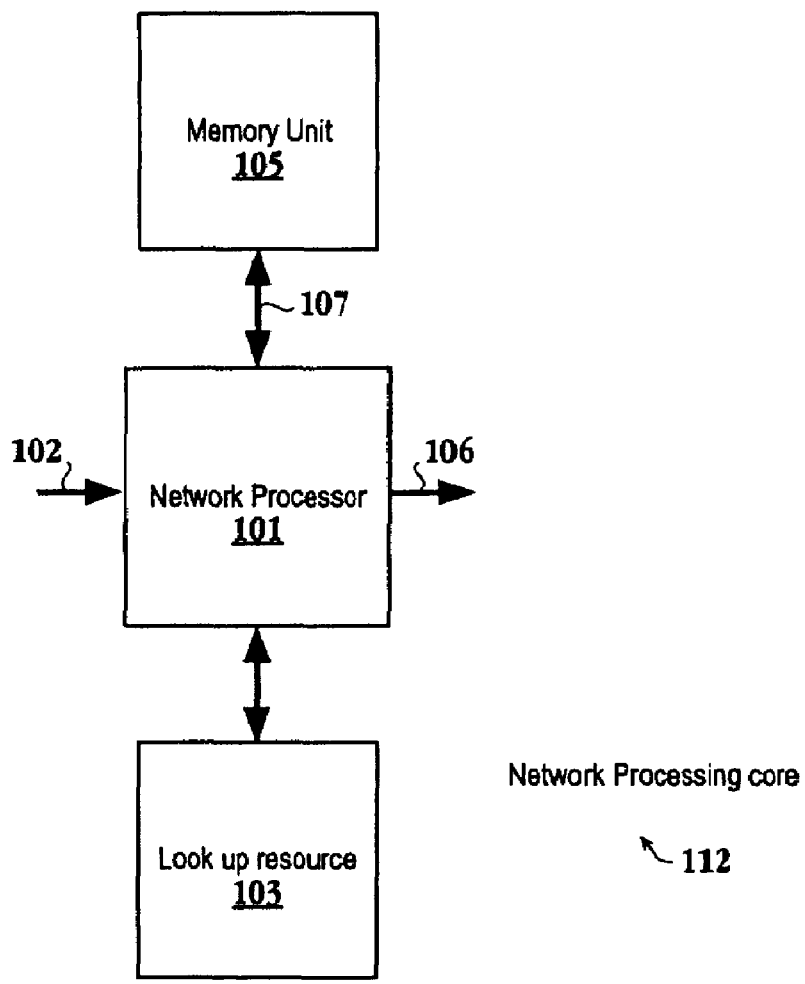
FIG. 1 shows an embodiment of a network processing core

Typically a network processor such as the network processor 101 of FIG. 1 has a certain amount of "performance". That is, better said, the network processor 101 is able to process packets at a certain speed or bandwidth (e.g., as measured in bits per second). As daily life becomes more and more dependent upon the retrieval of information from a network, operable networks (such as the Internet or private networks) are continually expanding in capacity. In order to implement the continued expansion in network capacity, the performances of the components from which networks are constructed (e.g., the routers or switches that behave as nodes within a network) are continually expanding as well.

Figure 2:
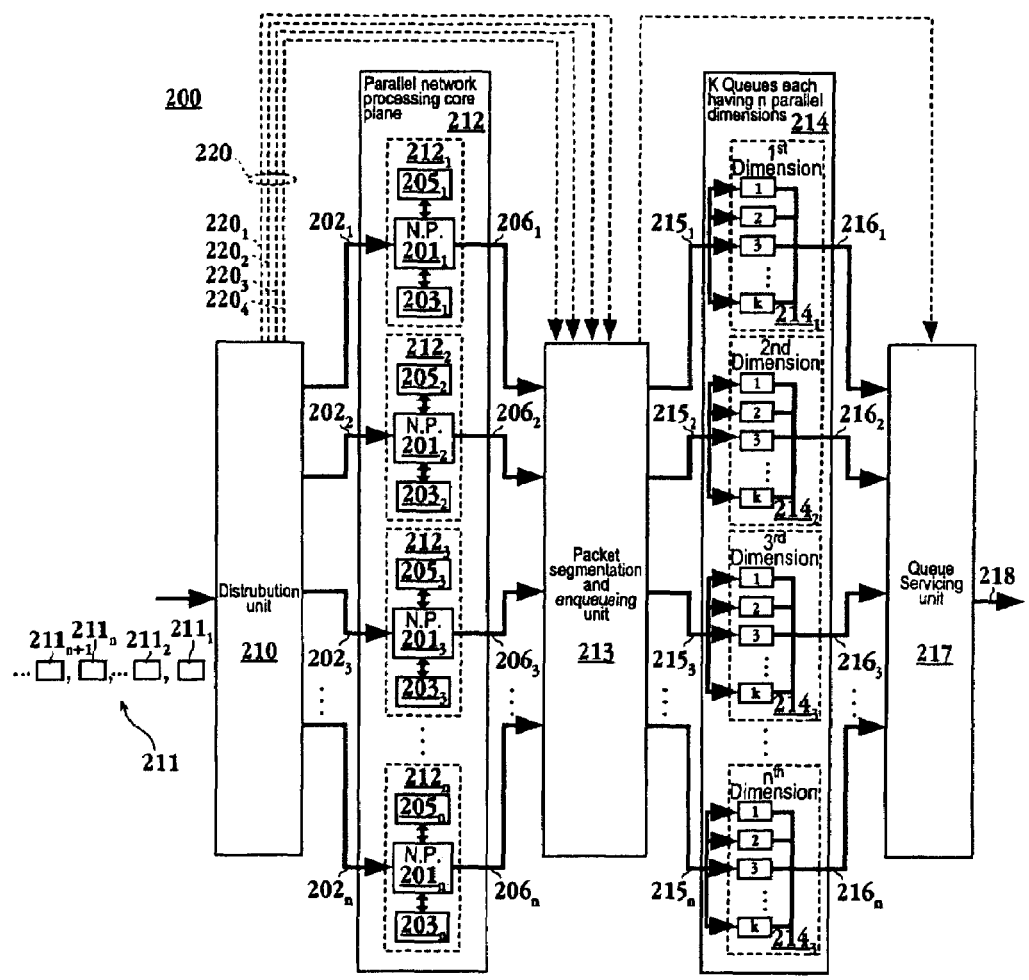
FIG. 2 shows an embodiment of an architecture for a processing machine that combines multiple processing cores that operate in parallel.

Accordingly, a potentially cost effective strategy for implementing the continued expansion of networking hardware performance is to organize a plurality of networking processors into a cooperative arrangement. As an example, if four 10 Giga-bit-per-second (Gpbs) network processors are cooperatively organized, the potential of the combined processing performance rises toward 40 Gpbs (because 4×10 Gbps=40 Gbps). FIG. 2 shows an example of a processing machine 200 that is aimed at organizing the processing power of N network processors $201_1$ through $201_N$ into a cooperative whole so that the processing power of each processor $201_1$ through $201_N$ contributes to the overall processing power of the processing machine 200 itself.

Here, the basic networking tasks performed by a network processor (e.g., packet classification and queuing management) are performed by the processing machine 200 so that a high capacity offered load can be handled. As just one possible application, the processing machine of FIG. 2 may be used to handle a high rate of traffic 211 from a single source (such as a single, high speed fiber optic cable); where, the traffic rate is greater than what a single network processor can handle. As such, the plurality of network processors $201_1$ through $201_N$ operate "in parallel" so that the processing power of each network processor $201_1$ through $201_N$ is combined in order to form a processing machine 200 that can handle the high traffic rate.

Note that the architecture 200 of FIG. 2 can be implemented on a single planar board (such as, as just a few examples, a line interface card (LIC) or "blade"; or, a centralized switching or routing card). The totality of the traffic 211 that is to be processed by the processing machine 200 is collected at a distribution unit 210. The distribution unit 210 distributes header information units (e.g., on a packet-by-packet basis) to the various network processors $201_1$ through $201_N$. Accordingly, each header information unit may be used by the network processor to which it is sent in order to classify the packet that it refers to (e.g., by using the header information to form a search key; that, in turn, is used as an input parameter for a look-up). Then, based upon the classification, the packet to which the header information unit refers is properly enqueued.

According to one possible embodiment, header information units are distributed to the networking processors by the distribution unit 210 on a round robin basis, wherein, the header information unit for a first packet is presented to a first network processor (e.g., network processor $201_1$), the header information unit for a second packet is presented to a second network processor (e.g., network processor $201_2$), the header information unit for a third packet is presented to a third network processor (e.g., network processor $201_3$), etc. In still other embodiments, some form of load balancing may be employed so that deviations from a strict round robin approach can be entertained. In this case, for example, a "busy" network processor may indicate to the distribution unit 210 that it is unwilling to entertain a new header information unit; and, in response, the distribution unit 210 will send a unit of header information to another "non-busy" network processor.

The header information units are presented to a particular network processor at its input (e.g., input $202_1$ for network processor $201_1$; input $202_2$ for network processor $201_2$; input $202_3$ for network processor $201_3$; etc.). Header information unit distributions may be made, for example, in parallel (e.g., wherein different header information units are presented to their corresponding network processor within the same clock cycle or group of clock cycles) or in series (e.g., wherein different header information units are presented to their corresponding network processor over the course of a different clock cycle or group of clock cycles). Also, according to designer choice, each header information unit that is sent to a network processor may be sent in isolated form; or, alternatively, appended to (or otherwise grouped with) the payload information of the packet to which it corresponds.

According to the former approach, the distribution unit 210 may "slice" or otherwise separate a packet's header information from its payload in order to form a header information unit. Here, the payload information may be later combined with the header information unit so that the packet as a whole is re-constructed. According to the later approach (wherein header information units are combined with their corresponding payload when presented to a network processor), potentially, the distribution unit 210 may be viewed as being designed to present not only header information units to the network processors $201_1$ through $201_N$; but also, entire packets as well.

As alluded to above, header information units are distributed to the network processors $201_1$ through $201_N$ so that the packets associated with input packet stream 211 can be properly classified. Packet classification, as discussed in the background, may be implemented by identifying a particular queue into which a packet is to be entered (e.g., so that the delay imposed upon the packet is appropriate with respect to the type of information the packet payload is carrying). Further still, as explained in more detail further below, each memory unit $205_1$ through $205_N$ that is coupled to a network processor (e.g., network processors $201_1$ through $201_N$ for each of memory units $205_1$ through $205_N$, respectively) may be used to assist in the queuing of packets into their appropriate queue.

Accordingly, in an embodiment implemented as observed in FIG. 2, each network processor $201_1$ through $201_N$ is part of a corresponding network processing core $212_1$ through $212_N$; wherein, the various pieces of each network processing core $212_1$ through $212_N$ can be used to help process a single stream of packets 211. Here, the look-up resource $203_1$ through $203_N$ of each network processing core $212_1$ through $212_N$ helps to provide the aforementioned queue identification (as part of packet classification) in response to a search key or other look up parameter that was constructed by its corresponding network processor $201_1$ through $201_N$ to which each look-up resource $203_1$ through $203_N$ is coupled.

According to the approach of FIG. 2, the processing machine 200 is configured to provide for "K" queues where each queue is of dimension N. The K queues are observed within the multidimensional queuing arrangement 214 of FIG. 2. Here, if each of the packets associated with packet stream 211 is to be stored amongst any of these "K" queues; note that, in various embodiments, each of the network processors $201_1$ through $201_N$ may be configured to identify which one of the K queues a particular packet is to be enqueued (in order to perform its respective classification function). As such, according to one embodiment, the processing machine 200 behaves as if only K queues are available for enqueuing any of the packets associated with input packet stream 211—regardless as to which networking processor classifies a particular packet.

Better said, the function of classifying packet stream 211 has been distributed across N processing cores $212_1$ through $212_N$. And, given that the processing machine 200 is configured to implement "K" queues, each of the packets associated with packet stream 211 should be indifferent (in terms of the service it receives) as to which of the N network processors $201_1$ through $201_N$ is used to classify it. In a sense, each of the network processors $201_1$ through $201_N$ can be viewed as having the same set of K "target" queues identified by the packet classification performed by each; and, accordingly, the look-up information stored into each of the various look-up resources $203_1$ through $203_N$ may be the same.

As described in more detail below, according to the design of FIG. 2, after a packet has been classified, the packet segmentation and enqueuing unit 213 is designed to segment the packet into smaller sections. Here, the header and payload information of a packet may be collected, combined or otherwise recognized as a single "unit" of information (e.g., as just one example, preserving in sequence consecutive packet pieces from the beginning of a packet's header to the end of its payload). Here, various embodiments may be employed in order to collect, form or recognize an entire packet at the segmentation and enqueuing distribution unit 213.

The depiction of FIG. 2 can be used to support a number a different design approaches. For example, according to a first approach, an entire packet (e.g., its header information unit and payload): 1) is directed along a network processing core input so that it can be classified (e.g., input $202_1$ if network processor $201_1$ classifies the packet; input $202_2$ if network processor $201_2$ classifies the packet; etc.); and 2) is directed along a network processing core output so that it can be segmented and enqueued (e.g., output $206_1$ if network processor $201_1$ classifies a packet; output $206_2$ if network processor $201_2$ classifies a packet; etc.).

That is, an entire packet (e.g., including both header and payload information) "flows through" a network processor in order to classify the packet and direct it to the segmentation and enqueuing unit 213. Here, the network processor that classifies the packet may append or otherwise present the classification results (at an output of the network processor) in such a manner that the segmentation and enqueuing unit 213 is able to correlate the classification results to the packet that the classification results pertain to.

According to other approaches, one of which is described in more detail below with respect to FIG. 6, packet headers are "sliced" from their corresponding payloads by the distribution unit 210 in order to prevent payload information from flowing through the network processors $201_1$-$201_N$. According to such an approach, isolated header information units (i.e., header information units that are not appended to or otherwise coupled to their corresponding payload information from the perspective of the network processor) flow through the network processors so that packet classification can be performed.

Upon classification, the header information unit may be presented to the packet segmentation and enqueuing unit 214 along the output of the network processor that performed the classification (e.g., output $206_1$ for classifications performed by network processor $201_1$; output $206_2$ for classifications performed by network processor $201_2$; etc.). Here, again, the network processor that classifies the packet in response to submission of an isolated header information unit may append or otherwise present the classification results (at an output of the network processor) in such a manner that the segmentation and enqueuing unit 213 is able to correlate the classification results to the header information unit or packet that the classification results pertain to.

According to an isolated header information unit approach, the payload information is routed "around" the network processors (i.e., so as not to flow through a network processor that performs packet classification); and, is combined with its appropriate header information (e.g., the header information unit) at the packet segmentation and enqueuing unit 213. For illustrative convenience, an alternative routing path 220 used for passing packet payloads from the distribution unit 210 to the segmentation and enqueuing unit 213 is shown in FIG. 2 (if it is to be viewed as corresponding to such an approach) with hashed routing paths $220_1$ through $220_N$.

In still other embodiments, "copies" of the header information observed in input packet stream 211 are distributed amongst the networking processing cores (e.g., one copy for each packet) by the distribution unit 210; and, a complete packet (e.g., including both header information and payload information) is routed around the processing cores to the packet segmentation and enqueing distribution unit 213. Here, routing paths $220_1$ through $220_N$ may be used to transport an entire packet (as opposed to just a packet's payload as in the previously discussed embodiment type); and, the network processor outputs (e.g., outputs $206_1$ through $206_N$) can be used to only provide the packet classification results for packet stream 211 (as opposed to providing the packet classification results "and" the sliced header information as well).

Regardless as to which approach is applied, given that the network processors $201_1$ through $201_N$ are used to perform packet classification, the network processors (in some fashion) provide the packet classification results to the packet segmentation and enqueuing unit 213. When a complete packet has been recognized by the segmentation and enqueuing unit 213, the complete packet is enqueued. According to the operation of the segmentation and enqueueing unit 213, a complete packet can be segmented into pieces and "spread over" various dimensions of the queue that was identified by the classification process.

Here, the effect of spreading smaller packet pieces of the same packet across multiple dimensions of the same queue corresponds to the implementation of a "multidimensional" queue. That is, for example, a particular queue out of the K available queues may be viewed as having associated storage space that is spread out across a plurality of separate memory units $214_1$ through $214_N$. In one embodiment, each memory unit is separately managed (e.g., through the use of N different memory controller circuits that each manage (at least partially) a different one of memory units $214_1$ through $214_N$). Because of their separated management, each memory unit $214_1$ through $214_N$ can be viewed as a different dimension of a particular queue. An alternative perspective is that each of the K queues are constructed with N parallel queues. That is, as the packet pieces are effectively held by memory units $214_1$ through $214_N$ that have been arranged in parallel with respect to one another, the activity of storing different pieces of the same packet across within these different memory units $214_1$ through $214_N$ corresponds to the enqueuing of the packet into multiple, parallel queues. FIG. 2 demonstrates this effect through the depiction of K queues each comprising N parallel arranged queues 214.

In various embodiments, the memory units $214_1$ through $214_N$ used to implement the multidimensional queues 214 may be different memory units than those associated with the network processing cores $212_1$ through $212_N$. As such, as the queuing functionality of the network processors $201_1$ through $201_N$ is therefore de-emphasized, it may be possible to remove memory units $205_1$ through $205_N$ from the design

200. However, in another class of embodiments, the network processors $201_1$ through $201_N$ are used not only to perform packet classification—but also to assist in packet queuing. And, as such, memory units $205_1$ through $205_N$ may be used to implement the K multidimensional queues 214 themselves; and, may therefore be associated with a collection of N network processing cores $212_1$ through $212_N$.

Here, if FIG. 2 is to be viewed according to this later approach, note that FIG. 2 can be viewed such that the organization/contents of memory units $205_1$ through $205_N$ have been re-represented "outside" the memory units $205_1$ through $205_N$ themselves with corresponding queue dimensions $214_1$ through $214_N$. That is, the first queuing dimension $214_1$ of the K queues corresponds to the organization/contents of the memory unit $205_1$ that is associated with the first network processing core $212_1$; the second queuing dimension $214_2$ of the K queues corresponds to the organization/contents of the memory unit $205_2$ associated with the second network processing core 2122; the third queuing dimension $214_3$ of the K queues corresponds to the organization/contents of the memory unit $205_3$ associated with the third network processing core $212_3$; . . . etc.; and, the Nth queuing dimension $214_N$ of the K queues corresponds to the organization/contents of the memory unit $205_N$ associated with the Nth network processing core $212_N$.

Although FIG. 2 re-represents the contents/organization of the memory units $205_1$ through $205_N$ outside the memory units $205_1$ through $205_N$, note that the processing flow performed by the processing machine 200 can be more easily understood. That is, recalling from the background that a network processing core 112 can be used to help perform two principle networking tasks (packet classification and queuing), FIG. 2 "lays out" both of these networking tasks in such a manner that makes the overall processing flow performed by the processing machine 200 of FIG. 2 easier to understand. A more detailed discussion of various embodiments that use the network processing core memories $205_1$ through $205_N$ in order to implement the multidimensional queues 214 is discussed at length with respect to FIGS. 5 through 7.

Figure 3A:
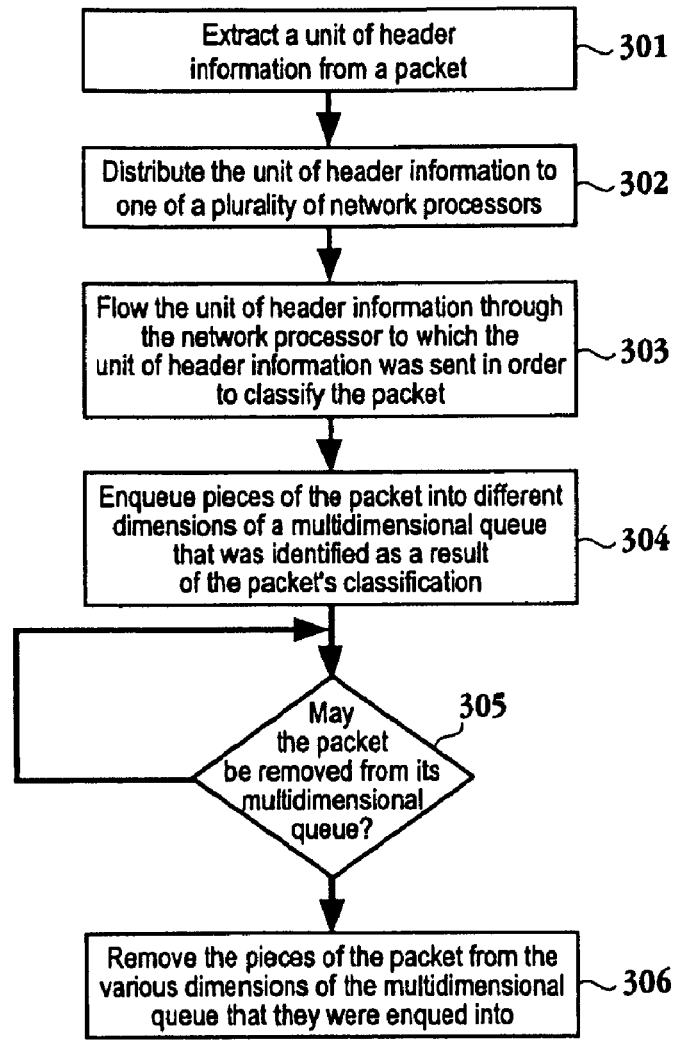
FIG. 3a shows an embodiment of a methodology that the processing machine of FIG. 2 can execute in order to classify and enqueue a packet.

Before discussing these details, however, some higher level perspectives may still be addressed. In particular, FIGS. 2, 3a and 3b may be used to gain further insight into a processing flow of processing machine 200. FIG. 3a relates to the processing flow for a single packet while FIG. 3b relates to the processing flow for a plurality of packets for an embodiment where a header information unit is sliced from its payload (which may also be referred to as "extracted" from its packet). Referring to FIGS. 2 and 3a, a unit of header information is extracted 301 from one of the packets associated with input packet stream 211 by the distribution unit 210. The unit of header information is then distributed 302 to one of the N network processors $201_1$ through $201_N$. The unit of header information then flows 303 through the network processor to which it was sent in order to classify the packet that the unit of header information is associated with.

Upon completion of packet classification (wherein a particular queue out of K queues is identified for storing a packet), a packet (including both header and payload information) is segmented into smaller pieces and enqueued (by the packet segmentation and enqueueing distribution unit 213) into different dimensions of the "multidimensional" queue that was identified as a result of the classification process (e.g., one of the K queues 214 observed in FIG. 214). Here, for example, the enqueuing process involves storing consecutive smaller pieces in a round robin fashion across each of dimensions $214_1$ through $214_N$ if the packet is broken down into at least N smaller pieces. The enqueued packet experiences an imposed delay 305 in its multidimensional queue until an appropriate moment arises for its release (e.g., as determined by a queue servicing unit 217 that effectively implements the service rates for each of the K queues 214). In order to release a packet from its multidimensional queue the pieces of the packet are removed 306 from the various dimensions of the multidimensional queue where they were stored (e.g., and made to appear across multidimensional queue outputs $216_1$ through $216_N$ as appropriate). The packet will subsequently flow from output 218.

Figure 3B:
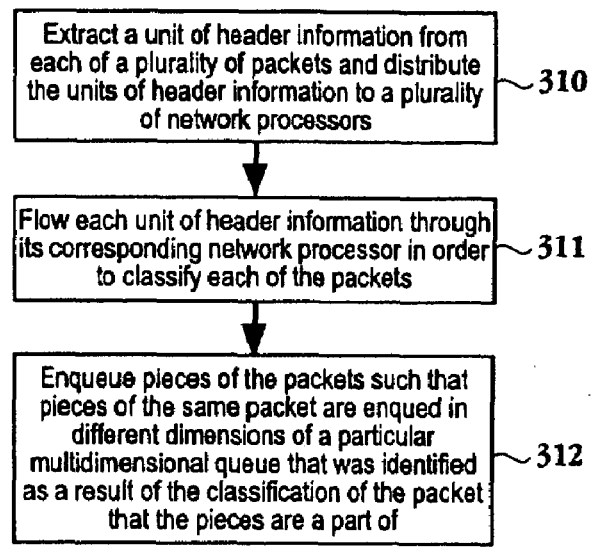
FIG. 3b shows an embodiment of a methodology that the processing machine of FIG. 2 can execute in order to classify and enqueue a plurality of packets.

Referring to FIG. 3b, a unit of header information is extracted from each of plurality of packets 211 (e.g., where the packets arrived upon the same fiber optic or copper cable); and, the units of header information are distributed to a plurality of network processors (e.g., different units of header information are provided to different network processors). The distribution unit 210 performs each of these distributions 310. Then, each unit of header information flows through its corresponding network processor in order to classify each of the packets whose header information was extracted.

Note that this process 311 may be performed "in parallel" such that one network processor executes its corresponding packet classification function while another network processor is also executing its own corresponding packet classification function. As such, packets that arrived on the same fiber optic or copper cable; or, are otherwise associated with a single flow of packets (which may be constructed or envisioned by grouping slower streams of packets together) may be classified by different network processors operating in parallel. Subsequent to the plurality of packets being classified, each packet while be segmented into pieces and enqueued such that pieces from the same packet will be enqueued into different dimensions of the particular multidimensional queue that was identified with the classification of the packet FIG. 4 elaborates on the functionality of the packet segmentation and enqueuing distribution unit 213 of FIG. 2 in more detail. According to the depiction of FIG. 4, a complete packet 430 is eventually collected, formed or otherwise recognized at the packet segmentation and enqueuing unit 413. The complete packet 430 may be appended by (or otherwise associated with) a data structure that identifies the particular queue (e.g., amongst K queues) into which the packet is to be stored.

Figure 4:
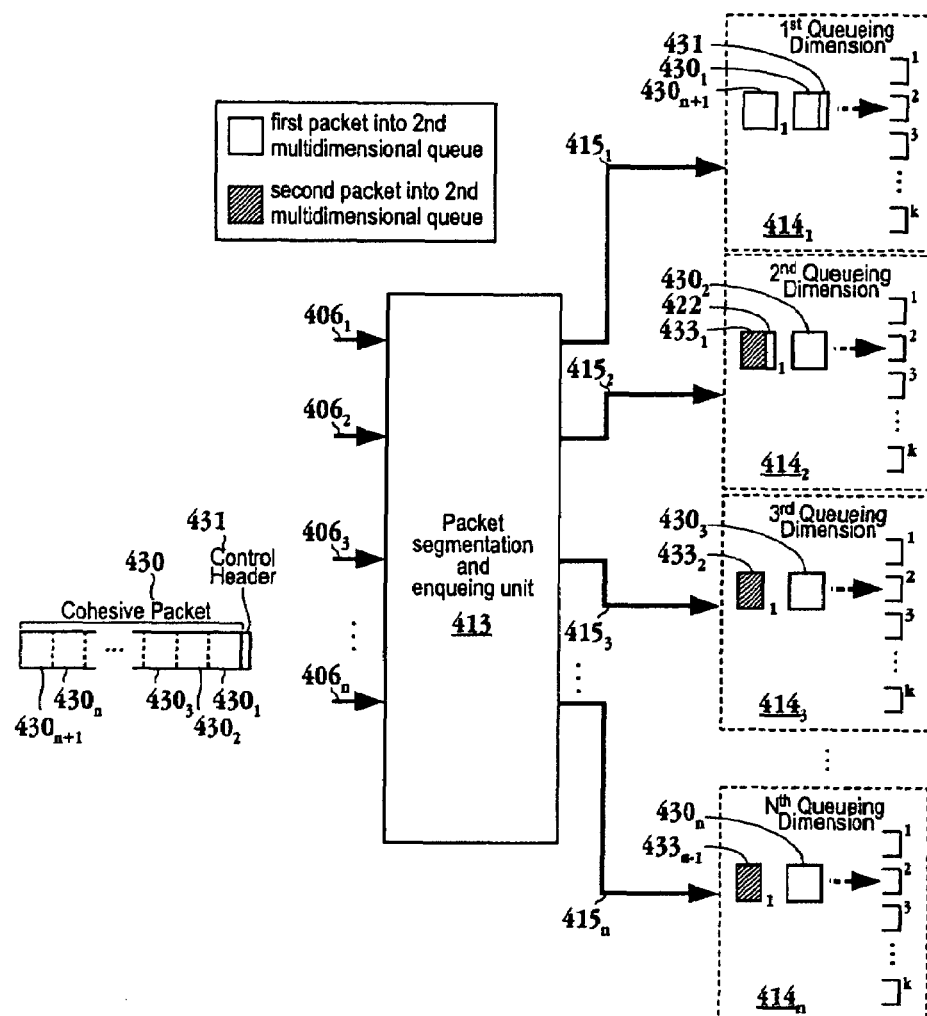
FIG. 4 shows a depiction of a packet that has been segmented into pieces being stored across various dimensions of a multidimensional queue.

According to the embodiment of FIG. 4, this data structure is implemented as a control header 431 that not only identifies the target queue for the packet but also identifies the size of the packet 430 (e.g., so that packet boundaries can be more easily understood by the packet segmentation unit and distribution unit 413). Here, the control header 431 may be fabricated by the network processor that classified the complete packet 430; and, may be appended to (or otherwise correlated with) the header information unit or packet by the network processor. Note also that the queue identification included in the control header 431 can be viewed as an embodiment of the results of the packet's classification.

Note that the complete packet 430 (which may also be referred to as a cohesive packet) has been drawn as being the combination of a plurality of smaller pieces of data (hereinafter, "pieces") $430_1$ through $430_{N+1}$. The segmentation and enqueuing unit 412 is designed to form these pieces (e.g., by segmenting the complete packet; or, by segmenting larger pieces of the complete packet) so that they may be separately stored into different dimensions of its target multidimensional queue. Here, referring to FIGS. 2 and 4, note that the K multidimensional queues 214 can each be viewed as having N dimensions $414_1$ through $414_N$.

As mentioned above, according to various possible embodiments, each unique dimension is implemented with a separately managed memory unit. For example, the memory management circuitry associated with each network processor $201_1$ through $201_N$ may be used to help manage its own corresponding dimension of the multidimensional queue. In this case, as observed with respect to the embodiment of FIG. 2, each unique memory unit $205_1$ through $205_N$ is a memory resource that is configured to be addressed by its own corresponding networking processor (e.g., network processor $201_1$ for memory unit $205_1$, network processor $201_1$ for memory unit $205_2$, etc).

Consistent with this perspective, memory management circuitry is circuitry responsible for setting up addressing signals (e.g., for write operations and/or read operations) applied to a memory unit. Accordingly, either the read operations or the write operations; or, both the read and the write operations, may be separately managed by the network processors. That is, for example, with respect to the queuing of packet pieces with memory unit $205_1$: 1) just the write operation of memory unit $205_1$ (for entry of a packet piece into its queue) is managed by network processor $201_1$; 2) just the read operation of memory unit $205_1$ (for removal of a packet piece from its queue) is managed by network processor $201_1$; or, 3) both the write and the read operations of memory unit $205_1$ (for entry and removal of a packet piece from its queue) is managed by network processor $201_1$. As such, to say that a network processor "manages" a memory unit embraces the notion that any of these operations have been implemented (e.g., just read, just write, or both read and write).

A memory unit can be implemented with a single memory chip (or a single memory array, where a memory array is block of memory cells organized according to rows and columns). A memory unit can also be implemented with a plurality of memory chips (or a plurality of memory arrays) that have been configured as a "bank" of memory. Memory banks are circuit designs that combine the individual address buses from a plurality of memory chips (or memory arrays) in order to form a single, wider address bus. The resulting effect is a memory resource that is addressed "as if" it were a single memory chip or array having a storage capacity that corresponds to the combination of the storage capacity of each of its constituent memory chips or memory arrays.

FIG. 4 shows an example as to how a complete packet 430 can be stored, in pieces, into different dimensions of the same queue. According to the example of FIG. 4, K queues are available for queuing. However, according to the example of FIG. 4, the second queue of the plurality of K queues has been identified from the classification of the packet 430 as the appropriate queue into which it should be enqueued. The packet segmentation and enqueuing unit 413 crafts the pieces of the packet and stores them into the various dimensions of the second of the K queues. Here, note that the packet can be formed into N+1 pieces $430_1$ through $430_{N+1}$.

According to the approach of FIG. 4, an attempt is made to evenly distribute the packet pieces across the various dimensions of the second multidimensional queue. As such, because the packet 430 comprises N+1 pieces, the second queue of each of the N dimensions $414_1$ through $414_N$ enques at least one piece; and, the second queue from one of these dimensions $414_1$ through $414_N$ enqueues a pair of pieces. Note that, according to an evenly distributed approach, once all of the pieces are enqueued into the second multidimensional queue, the pieces are arranged as if they had been distributed in a round robin fashion.

For example, if the second multidimensional queue is empty at the time the packet is ready to be enqueued by the packet segmentation and enqueuing unit 413 (and, if the packet segmentation and enqueuing unit 413 is configured to store the first piece of a packet into the first dimension $414_1$ when the multidimensional queue into which it is to be enqueued is empty); then, the first piece $430_1$ is stored into the second queue of the first dimension $414_1$; the second piece $430_2$ is stored into the second queue of the second dimension $414_2$; the third piece $430_3$ is stored into the second queue of the third dimension $414_3$; etc.; and, the Nth piece $430_N$ is stored into the second queue of the Nth dimension $414_N$. Note that the control header 431 can be stored along with the first piece $430_1$ which may, in turn, cause the size of the first piece $430_1$ to be less than the size of the other pieces (by the size of the control header 431). As such, the packet segmentation and enqueuing distribution unit 413 may also be configured such that each piece of data stored into a multidimensional queue is of the same size.

In various possible embodiments, one of which is discussed at length further below, packet pieces are simultaneously stored into each of the N dimensions of a multidimensional queue. As such, according to the particular piece-to-dimension pattern observed in FIG. 4, the first N pieces $430_1$ through $430_N$ of the packet 430 are simultaneously stored into their corresponding dimension $314_1$ through $314_N$. For example, each of the first N pieces $430_1$ through $430_N$ may stored within the same clock cycle (or group of clock cycles) used to time the writing of the pieces into their corresponding memory unit.

Here, according to this approach, after the first N pieces $430_1$ through $430_N$ have been simultaneously stored across the N dimensions $414_N$, the N+1$^{th}$ piece $430_{N+1}$ is stored into the second queue of the first dimension $414_1$ (e.g., during a clock cycle (or group of clock cycles) following the clock cycle (or group of clock cycles) used to write the first N pieces $430_1$ through $430_N$. In alternate embodiments, the first N pieces $430_1$ through $430_N$ may be stored at different times (e.g., in a round robin fashion where a first piece (e.g., piece $430_1$) is stored prior to a second piece (e.g., piece $430_2$)).

The depiction of FIG. 4 also addresses the handling of a second, following packet that is also enqueued in the second queue amongst the K queues (i.e., the same multidimensional queue that packet 430 is enqueued into). Here, note that the round robin approach is continued. That is, the enqueuing into the second queue simply continues where the enqueuing of the previous packet ended. FIG. 4 shows a simplistic example where the last piece of the first packet (piece $430_{N+1}$) was coextensive with the size of a "piece" as formed by the packet segmentation and enqueuing unit 413.

As such, the first piece of the next packet to be enqueued into the second multidimensional queue (which comprises header information 432 and packet information $433_1$) is stored in the second queuing dimension. If the second packet can be broken down into at least N−1 pieces, the N−1th piece is stored in the Nth queuing dimension. According to the design of at least one further embodiment, if the last piece of a packet is less than the size of a packet piece as formed by the packet segmentation and enqueuing unit 413, the following packet begins to be stored into the same dimension as the aforementioned last piece so as to "fill" the queuing space up to a full piece size. As such, packets are tightly packed into the same dimension. An example would be if packet piece $430_{N+1}$ were less than the size of a full piece. In such a situation, the second packet (represented by header 432 and a portion of piece $433_1$) would instead begin to be stored into the first queuing dimension rather than the second queuing dimension.

Figure 5:
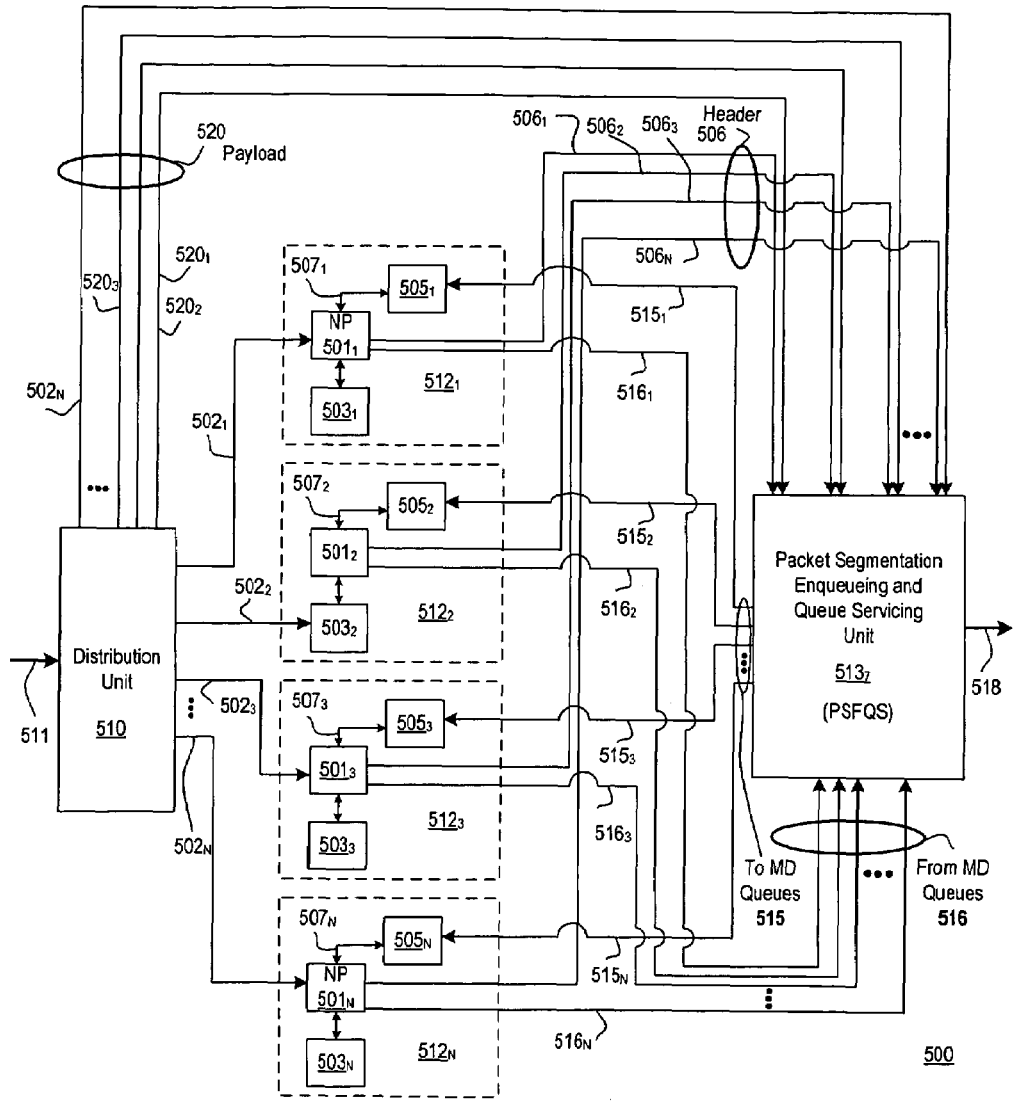
FIG. 5 shows an embodiment of a hardware implementation for the processing machine of FIG. 2.

Before continuing on to FIG. 5, note that the multidimensional queues may be "bypassed" via bypass line 210. Here, for example, if the particular multidimensional queue into which a classified packet is to be stored is empty, it may be more efficient to simply "skip over" the multidimensional queue enqueuing process and prepare the packet instead for a more imminent presentation at output 218. As such, the processing machine design of FIG. 2 may be viewed as supporting this additional functional feature.

As alluded to above, FIG. 5 relates to an embodiment where the memory units $505_1$ through $505_N$ of N network processing cores $512_1$ through $512_N$ are used to implement K multidimensional queues of dimension N. Referring to FIGS. 2 and 5, note that FIG. 5 may be viewed as an embodiment of the processing machine of FIG. 2 wherein distribution unit 510 of FIG. 5 corresponds to distribution unit 210 of FIG. 2 and network processing cores $512_1$ through $512_N$ correspond to network processing cores.

Note, however, that the packet segmentation and enqueing unit 213 of FIG. 2 and the queue servicing unit of FIG. 2 have been merged into in order to form the packet segmentation, enqueuing and queue servicing unit 5137 of FIG. 5 (hereinafter, the PSEQS unit 5137). Note that, depending on designer preference, the PSEQS unit 5137 can be implemented upon a single silicon chip (or, alternatively, may be implemented with multiple silicon chips). Note also that the PSEQS unit 5137 reflects the fact that enqueued packets are "written back" to the memory units $505_1$ through $505_N$ associated with the network processing cores $512_1$ through $512_N$ in order to enqueue them into a multidimensional queue.

That is, according to the particular approach of FIG. 5, packet pieces flow from the "to multidimensional (MD) queues" outputs $515_1$ through $515_N$ (which may be considered as an embodiment of outputs $215_1$ through $215_N$ of FIG. 2) and are written into their corresponding memory unit $505_1$ through $505_N$. When the PSEQS 5137 determines that the moment has arrived to remove a packet from its multidimensional queue, the pieces of the packet are read from their corresponding memory unit.

According to the depiction of FIG. 5, the network processors $501_1$ through $501_N$ assist in the queuing process by performing the appropriate read operations (e.g., along memory interfaces $507_1$ through $507_N$) and presenting the desired packet pieces along the "from MD queues" inputs $516_1$ through $516_N$ to the PSEQS unit 5137. Here, the PSEQS 5137 may signify to the network processors $501_1$ through $501_N$ (e.g., via a control line not shown in FIG. 5 for illustrative ease) that a packet is to be removed from a multidimensional queue (e.g., by making reference to a particular packet and/or queue).

Note that various alternative design approaches are also possible. For example, according to one alternative design, the role of the network processors $501_1$ through $501_N$ is reversed with respect to the approach described just above. That is, packet pieces flow from the PSEQS 5137 to the network processors $501_1$ through $501_N$ for entry of a packet into a multidimensional queue (whereupon, the network processors $501_1$ through $501_N$ write the pieces into their respective memory unit along memory interfaces $507_1$ through $507_N$); and, the PSEQS 5137 reads packet pieces from memory units $505_1$ through $505_N$ in order to remove a packet from a multidimensional queue.

Accordingly, in this design approach, the "to MD queues" data lines $515_1$ through $515_N$ should terminate at their respective network processor $501_1$ through $501_N$ (rather than their respective memory unit $505_1$ through $505_N$ as observed in FIG. 5); and, the "from MD queues" data lines $516_1$ through $516_N$ should emanate from their respective memory units $505_1$ through $505_N$ (rather than their respective network processors $501_1$ through $501_N$ as observed in FIG. 5). Here, the PSEQS 5137 may signify to the network processors $501_1$ through $501_N$ (e.g., via a control line) that a packet is to be entered into a multidimensional queue (e.g., by making reference to a particular packet and/or queue).

In yet another embodiment, packet pieces may flow between the network processors $501_1$ through $501_N$ and the PSEQS 5137 for both entrance of a packet to a multidimensional queue and the removal of a packet from a multidimensional queue. Here, the network processors $501_1$ through $501_N$ both write packet pieces into their respective memory units $505_1$ through $505_N$ along their respective memory interface $507_1$ through $507_N$ (for enqueuing a packet into a multidimensional queue); and, read packet pieces from their respective memory units $505_1$ through $505_N$ along their respective memory interface $507_1$ through $507_N$ (for removal of a packet from a multidimensional queue).

Accordingly, the "to MD queues" data lines $515_1$ through $515_N$ should terminate at their respective network processor $501_1$ through $501_N$ rather than their respective memory unit (as observed in FIG. 5). Here, the PSEQS 5137 may signify to the network processors $501_1$ through $501_N$ (e.g., via a control line) that a packet is to be entered into a multidimensional queue (e.g., by making reference to a particular packet and/or queue); and, the PSEQS 5137 may also signify to the network processors $501_1$ through $501_N$ (e.g., via the same or other control line) that a packet is to be removed from a multidimensional queue (e.g., again, by making reference to a particular packet and/or queue).

The extent and manner that a network processor becomes involved in the packet enqueuing and removal process may vary from embodiment to embodiment depending on designer choice and/or whatever specific operational features the network processors $501_1$ through $501_N$ are capable of performing. Regardless, note that the network processors $501_1$ through $501_N$ may perform their packet enqueuing and/or packet removal operations in parallel with one another in order to increase the overall performance of the processing machine 500. That is, for example, while one network processor is reading or writing a packet piece from or to its respective memory unit, another network processor is reading or writing a packet piece from or to its respective memory unit. Here, note that the pieces may be pieces of the same packet; and, furthermore, that these reading/writing activities may be occurring while the network processors are also classifying other packets.

Note also that, for simplicity, dual ported memory units $505_1$ through $505_N$ capable of being read from a first port (e.g., via memory interfaces $507_1$ through $507_N$) and written to from a second port (e.g., "to MD queues" data lines $516_1$ though $516_N$) have been indicated. It is important to point out that those of ordinary skill will be able to readily implement single ported memory units $505_1$ through $505_N$ that effectively merge the different access means (e.g., from/to the network processors and from/to the PSEQS 5137) to a single address bus and data bus.

Figure 6:
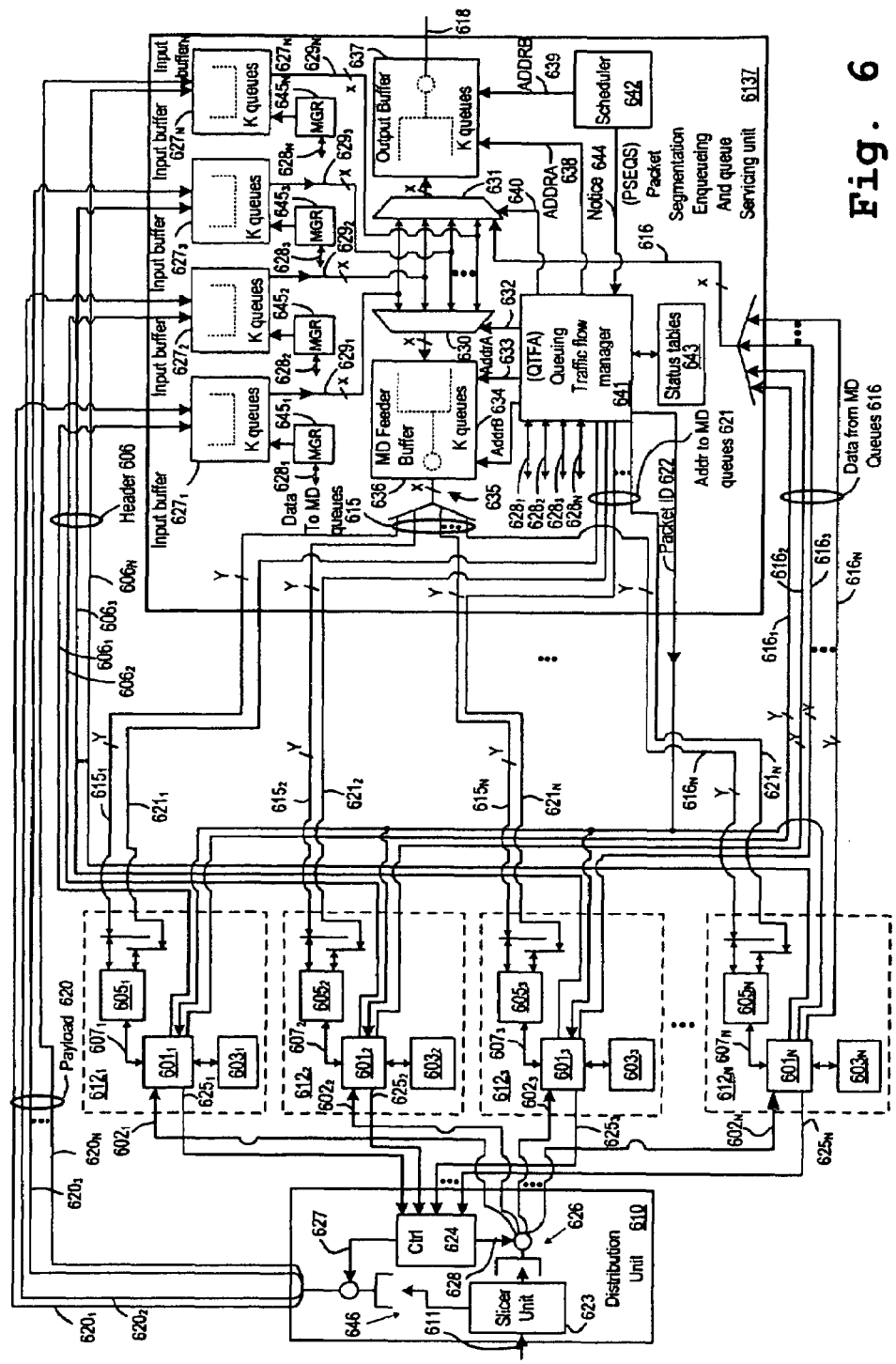
FIG. 6 shows an embodiment of a circuit design that conforms to the hardware implementation of FIG. 5.

FIG. 6 elaborates on an embodiment of the PSEQS 5137; however, before continuing on to FIG. 6, note that the different approaches discussed with respect to FIG. 2 for distributing header information units to the plurality of network processors may also be embraced with respect to those embodiments that choose to implement the multidimensional queues with the memory units of the networking processing cores. That is, for example, entire packets may flow through the network processors during packet classification; or, isolated header information units (that are copies or not copies) may flow through the network processors.

FIG. 5 suggest the use of isolated header information units in that network processor output lines $506_1$ through $506_N$ are labeled as "header" lines; and that, distribution unit output lines $520_1$ through $520_N$ are labeled as "payload" lines. As such, complete packets can be recognized by the PSEQS 5137 via some form of combination of the data appearing on these lines $506_1$ through $506_N$ and $520_1$ through $520_N$. Nevertheless, if packets are to flow through the network processors, lines $520_1$ through $520_N$ may be eliminated and lines $506_1$ through $506_N$ may carry complete packets; or, alternatively, if copies of header information are passed through the network processors, lines $520_1$ through $520_N$ may be configured to carry both header and payload information. Regardless, network processor outputs $506_1$ through $506_N$ may be used to present packet classification results (or other output lines not indicated in FIG. 5 may be employed in the alternative).

FIG. 6 elaborates on an embodiment of a processing machine 600 that conforms to the particular approach observed in FIG. 5. Before continuing however, it should be pointed out that the design approach of FIG. 6 is just one of many possible design approaches that could be used to implement the circuitry observed in FIG. 5 or 2. For example, various alternative circuit designs for the PSEQS may be attempted that differ from the specific PSEQS approach 6137 observed in FIG. 6; and, likewise, various alternative circuit designs for the distribution unit may be attempted that differ from the specific distribution unit approach observed in FIG. 6.

Note that embodiments of both the distribution unit 610 and the PSEQS 6137 have been shown in greater detail. With respect to the distribution unit, a single stream of packets (which may be implemented as the combination of a number of slower packet streams) is presented at input 611. Each packet is sliced between its header/payload boundary by a slicer unit 623; and, as a result, packet payloads are enqueued in queue 646; and packet headers are enqueued in queue 626.

Here, each sliced header may be used as a header information unit. Control logic 624 control the distribution of the header information units to the network processors $601_1$ through $601_N$ via network processor inputs $602_1$ through $602_N$, respectively. Here, the network processors $601_1$ through $601_N$ are configured to indicate to the control logic 624 (via network processor outputs $625_1$ through $625_N$) that they are "busy" and therefore should not be sent a header information unit (or, alternatively, indicate that they are "available" to accept a header information unit). In response to the signals presented at outputs $625_1$ through $625_N$, the control logic 624 can (for example) issue a "next" header information unit to a "next available" network processor.

Furthermore, outputs $625_1$ through $625_N$ may be expanded so as to indicate that packet classification is complete for a particular packet. In response, the control logic 624 issues the corresponding payload information from queue 626 along one of the payload outputs 620 so that the header information (presented at one of the network processor outputs 606 used to transport header information units and packet classification results) and the payload information can be recognized in complete packet form by the PSEQS 6137. As such, for example, for a packet classified by network processor $601_N$, the header information and payload information for the packet will appear at inputs $606_N$ and $620_N$ of the PSEQS 6137, respectively.

The PSEQS 6137 embodiment of FIG. 6 may be viewed as having three buffering functions. A first buffering function, represented by buffers $627_1$ through $627_N$ (which may be referred to as input buffers $627_1$ through $627_N$) are used to receive packets from the distribution unit 610 and network processors $601_1$ through $601_N$. A second buffering function, represented by buffer 636 (which may be referred to as the multidimensional feeder buffer 636), is used to prepare packets for segmentation and enqueuing into the multidimensional queues (that are implemented with memory units $605_1$ through $605_N$). A third buffering function, represented by buffer 637 (which may be referred to as the output buffer 637) is used to prepare packets for issuance at output 618.

It is important to note that those of ordinary skill will be able to implement any of buffers $627_1$ through $627_N$, 636, and 637 (as well as queues 626 and 646 that are associated with the distribution unit 610) by various means. For example, buffers $627_1$ through $627_N$, 636, and 637 may be constructed as First-In-First-Out (FIFO) buffers with arrays of standard memory cells such as SRAM cells or DRAM cells. In a particular embodiment, each of buffers $627_1$ through $627_N$, 636, and 637 are implemented with arrays of SRAM cells that are integrated "on chip" along with the other circuitry used to construct the PSEQS 6137. As is known in the art, "buffers" and "buffering" are terms that are largely synonymous with the terms "queues" and "queuing", respectively.

Furthermore, according to various embodiments, buffers $627_1$ through $627_N$, 636, and 637 are configured with the notion that K separate queues are available in each buffer. That is, each of buffers $627_1$ through $627_N$, 636, and 637 may be viewed as being further sub-divided into K queues (e.g., similar to one of the queuing dimensions observed in FIG. 4). As such note that a single packet may traverse each of multiple buffers (e.g., one of buffers 627, buffer 636, one of the K multidimensional queues and buffer 637) in order to progress from inputs 606, 620 to output 618.

Here, the rate at which the packet traverses through these buffers should be consistent with the service rate of the particular one of the K target queues that the packet was classified for (i.e., the kth target queue; or, simply, the kth queue). As such, K effective queuing paths may be envisioned where each of the K queuing paths (for those packets to be enqueued in a multidimensional queue) comprises a kth queue within one of the input buffers 627, a kth queue within the multidimensional feeder buffer 636, a kth multidimensional queue, and a kth queue within one of the output buffers 637 (where the value of "k" is the term "kth" is same throughout the queuing path).

Note that each of buffers 627, 636 and 637 may be further configured to have a fixed depth for each of its K queues through the partitioning of the address space used to access the memory cell arrays that implement each queue. For example, if the memory arrays used to implement buffers 627, 636 and 637 are configured to issue X bits for each unique address value; then, a depth of 16 sets of X bits can be arranged for each of K=128 queues by implementing an eleven bit address wherein the highest ordered seven bits specify which of the 128 queues is being accessed and wherein the lowest ordered four bits specifies which of the 16 sets of X bits is to be accessed within a particular queue. Here, as the packet classification results can be represented with 7 bits, note that packet classification results can be used to specify the addressing of the appropriate queue. Alternatively, as the queues operate in a FIFO fashion, the buffers may be designed to automatically shift their contents toward the buffer output.

According to the embodiment of FIG. 6, each of input buffers $627_1$ through $627_N$ has an associated manager unit $628_1$ through $628_N$. The manger unit is used to control or otherwise monitor the issuance and departure of each packet to and from its corresponding input buffer. According to one embodiment, in response to the reception from a network processor of a control header (such as control header 431 of FIG. 4) that indicates the size and target queue (of K possible queues) of a particular packet (wherein the control header may be received via the appropriate one of lines 606—the coupling of which to any of the manager units is not shown for illustrative ease), the manager unit oversees (or is at least made aware of) the writing of the packet into the indicated target queue within its corresponding input buffer 627.

Here, header information from one of lines 606 may be entered into an input buffer before payload information from the corresponding one of lines 620 is entered into the input buffer (in order to sequence the information of the packet in its correct order). That is, for example, if a packet is classified by network processor $601_3$; then, header information from network processor output $606_3$ is written into buffer $627_3$ before the payload information of the packet is written into input buffer $627_3$ from distribution unit output $620_3$. Note that this activity can be viewed as one embodiment by which a packet if formed at the PSEQS.

Once a packet has been stored into its appropriate queue within an input buffer, the manager unit of the affected input buffer gives notice of the packet's arrival to the queuing traffic and control manager (QTFM) 641 via one of control interfaces $628_1$ through $628_N$. Here, the information within the aforementioned control header may be forwarded to the QTFM 641; and, as such, the QTFM 641 will understand that a packet for the indicated "kth" target queue (and of the size indicated) is waiting in the input buffer managed by the manager unit that sent the notification.

By reference to these tables 643, the QTFM can initially determine whether or not bypassing of the multidimensional queues is appropriate. Here, the set of status tables 643 are coupled to the QTFM 641 that, according to one embodiment, effectively keep track of: 1) the number of packets stored within each of the K queues that are "built into" the MD feeder buffer 636; 2) the number of packets stored within each of the K multidimensional queues; and, 3) the number of packets stored within each of the K queues that are "built into" the output buffer 637.

Recall that bypassing the multidimensional queues was first discussed (with reference to bypass path 250) with respect to FIG. 2. Bypassing is accomplished according to the embodiment of FIG. 6 by transferring a packet from its input buffer to the output buffer 637 through multiplexer 631. As such, a bypassing packet will be stored into the output buffer 637 without having to pass through a multidimensional queue. In embodiment, the decision whether or not to bypass can be made in light of the space available in the kth queue (i.e., the target queue of the packet waiting in its input buffer); and, whether or not the kth queue in the MD feeder buffer 636 and the kth multidimensional queue is "empty".

Here, if the output buffer has room to entertain the packet in the kth queue and if both the kth multidimensional queue and the kth queue within the MD feeder buffer 636 are empty, the packet may be transferred from its input buffer to the output buffer 637 without disrupting the FIFO ordering of the kth queuing path. Here, in order to bypass the packet, permission to issue the packet from its input buffer is communicated to the appropriate input buffer manager (via one of control interfaces $628_1$ through $628_N$), the output of multiplexer 631 is enabled, and MUX select line 640 is configured to select the output of the input buffer where the bypassing packet resides (i.e., one of outputs $629_1$ through $629_N$). The QTFM 641, with knowledge of where available space resides in the kth queue of output buffer 637, also places the appropriate address value(s) on address lines 638.

If bypassing is not appropriate, the packet is transferred from its input buffer to the kth queue of the MD feeder buffer 636 in order to prepare the packet for entry into the kth multidimensional queue. Here, in order transfer a packet from the input buffer where it resides to the FD feeder buffer 636, permission to issue the packet from its input buffer is communicated to the appropriate input buffer manager (via one of control interfaces $628_1$ through $628_N$), the output of multiplexer 630 is enabled, and MUX select line 632 is configured to select the output of the input buffer where the packet resides (i.e., one of outputs $629_1$ through $629_N$). The QTFM 641, with knowledge of where available space resides in the kth queue of MD feeder buffer 637, also places the appropriate address value(s) on address lines 633.

After a packet has been entered into the kth queue of the MD feeder buffer, it will eventually be written into the kth multidimensional queue. When the QTFM 641 decides the time is appropriate for storing the packet into the kth multidimensional queue, the QTFM 641 will cause packet pieces (that are to be properly enqueued into the kth multidimensional queue) to be written into the kth queue of each of memory units $605_1$ through $605_N$ during the same cycle (noting that a cycle is a moment of time measured by one or more clock cycles). In an embodiment, because they are written during the same cycle, the packet pieces are written simultaneously into their respective memory unit $605_1$ through $605_N$.

The simultaneous writing into each of memory units $605_1$ through $605_N$ ensures a high degree of efficiency because cycles are not "wasted" with one or more empty writes to a particular memory unit. Here, the MD feeder buffer 636 is designed to "pack" portions of consecutive packets together (if appropriate) so that a full word width "NY" of data is issued from the PSEQS 6137 during each cycle wherein a write to the memory units $605_1$ through $605_N$ is to take place. In an embodiment, the word width size "X" of the MD feeder buffer output 635 is set equal to the number of multidimensional queueing dimensions "N" multiplied by the data word width "Y" of each memory unit $605_1$ through $605_N$.

As such, the QTFM 641 may be designed during normal operation to prohibit the issuance of data from a kth queue within the MD feeder buffer 636 unless and until the kth queue within the MD feeder buffer 636 has at least X=NY bits of data. Better said, if a kth queue within the MD feeder buffer 636 has less than NY bits of data, the kth queue within the MD feeder buffer 636 is not allowed to be used as a source of data to be written into memory units $205_1$ through $205_N$. By so doing, "non empty" writes to any of memory units $605_1$ through $605_N$ should be avoided. In further embodiments, the QTFM 641 may be designed to continue writing to a multidimensional queue until a packet is completely emptied from the MD feeder buffer 636.

For example, if 12 write cycles (or even 12 burst write cycles) are needed to completely empty the packet from buffer 636, the QTFM will ensure that 12 consecutive write cycles are performed into the target multidimensional queue. As such, an additional limitation that may be added to those mentioned just above is that at least the last piece of the packet to be written into a multidimensional queue is within the MD feeder buffer 636 before the packet is allowed to be written into the multidimensional queue. Here, the "packing" function of the MD feeder buffer may be used to "take" the first one or more pieces of the next, following packet in order to ensure that each appearance of new data at the MD feeder buffer output 635 fills the X bit wide bus of the output 635.

In yet another a further embodiment, the memory units $605_1$ through $605_N$ are written to "in bursts" wherein writes to data memory are performed with a plurality "Z" of consecutive, discrete writes into the memory units $605_1$ through $605_N$. Four example, if Z=4, four consecutive waves of NY worth of bits will flow from the PSEQS 6137 for each write cycle to a particular, kth multidimensional queue. In another further embodiment, the QTFM may be designed to relax the requirement highlighted above if traffic loading is light; or, if one or more pieces of a particular packet have waited "too long" (e.g., greater than some temporal threshold) in the MD feeder buffer 636.

Note that if X=NY, the maximum output data rate of the MD feeder buffer 636 may be designed to be no less than the combined data rate of memory units $605_1$ through $605_N$. Furthermore, by configuring the data bus widths of the input buffers $627_1$ through $627_N$ to be X bits as well, the data rates of these buffers may also be designed to be no less than the combined data rate of memory units $605_1$ through $605_N$. As such, the performance of the overall machine 600 may be designed to be limited by the combined performance of the memory units $605_1$ through $605_N$ rather than the PSEQS 6137.

With respect to the packet segmentation performed by the PSEQS 6137, note that the splitting of the X wide MD feeder output 635 data bus into N data paths of width Y corresponds to the formation of N packet pieces each of size Y. If burst writing is used to write to the memory units $605_1$ through $605_N$, the size of each packet piece can be viewed as ZY bits of data where Z corresponds to the number of consecutive waves of data appearing on the data bus $605_1$ through $605_N$ per burst write cycle. More discussion concerning the packing performed by the MD feeder buffer 636 and the concept of burst writing is discussed with respect to FIG. 7.

Regardless if burst writing is used or not, note that the QTFM 641 controls address values for the memory units $605_1$ through $605_N$ via address lines $621_1$ through $621_N$. Particularly, identical address values may be presented on each on address lines $621_1$ through $621_N$ during a same write cycle so that packet pieces that are stored during the same write cycle are stored at the same address locations in each of memory units $605_1$ through $605_N$. Even though the same address values may be made to simultaneously appear on address lines $621_1$ through $621_N$, multiple address lines are used to decrease the capacitance on the addressing lines. The specific address values employed may be obtained from a link list (that can be viewed as part of status tables 643) that keeps track of available address spaces where pieces of packets can be stored. The use of link lists allows the depth of each multidimensional queue (i.e., the number of packet pieces it can store) to be configurable (e.g., by a software setting).

Once it is determined that a packet should be removed from a multidimensional queue, the QTFM 641 gives notice to the network processors $601_1$ through $601_N$ that the packet should be read from their respective memory units $605_1$ through $605_N$. Here, notification that a packet should be removed is provided along the Packet ID output 622 of the QTFM 641. In an embodiment, the notification includes a pointer to the address location where the first piece of the packet is stored. If the packet pieces are link listed, each reading of a packet piece will include a pointer to the address location where the next piece of the packet is located.

In order to ensure that the entire packet is removed from the multidimensional queue that it was stored into, the size of the packet should be grasped, in some form, by the network processors $601_1$ through $601_N$ (or at least, the number of consecutive write cycles to be performed should be understood). As such, in one embodiment, the size of the packet (or the number of appropriate consecutive write cycles) is indicated by the QTFM 641 at the QTFM Packet ID output 622. In another embodiment, the information appears in the link list header included with the last packet piece to be read includes a flag that indicates its is the last piece to be read. Other approaches are also possible.

The decision that a packet should be removed from a multidimensional queue can be made in light of the data within the status tables 643. For example, if the QTFM 641 observes that a kth queue within the output buffer 637 is starting to become empty (e.g., by falling beneath some threshold of amount of data stored), the QTFM 641 may trigger an internal reminder to retrieve the next packet from the kth multidimensional queue at a subsequent opportunity. As the packet is being read by the network processors $601_1$ through $601_N$, the packet pieces flow from the network processor outputs $616_1$ through $616_N$ to multiplexer 631.

Note that, according to the particular embodiment of FIG. 6, the data flows from each of the N "Y bit wide" data buses $616_1$ through $616_N$ are merged into a larger X bit wide data bus 616 within the PSEQS. Again, pieces of data may be retrieved through one or more simultaneously executed burst reads (e.g., at memory unit interface $607_1$ through $607_N$) that are executed by each of network processors $601_1$ through $601_N$. Parallel reading of memory units $605_1$ through $605_N$ will cause packet pieces to be read from the kth queue of each of memory units $605_1$ through $605_N$ during the same read cycle.

Because they are read during the same cycle, the packet pieces should flow simultaneously through the network processor that read them and onto the corresponding network processor data bus 616. In order to write the packet into the kth queue within the output buffer 637, the QTFM: 1) enables the output of multiplexer 631; 2) configures MUX select line 640 to select data bus 616; and 3) sets up the proper addressing of address bus 638 so that the packet begins to be stored at the next available location within the kth queue of the output buffer 637. Note that the embodiment described just above corresponds to an embodiment where the network processors $601_1$ through $601_N$ are expected to manage the reading (i.e., removal) of packet pieces of from their corresponding memory units.

Scheduler 642 effectively controls the service rates applied to each of the K queuing paths that are managed by the PSEQS. Here, service rate is the rate at which packets are removed from a queue. As output buffer 637 corresponds to the last set of K queues in the queuing paths, the rate at which packets flow through the PSEQS and multidimensional queues (in light of its particular classification) is largely affected by the rate at which packets are removed from the output buffer 637 and presented at output 618. That is, if a kth queue within the output buffer 637 receives a slow rate of service from the scheduler 642, packets will begin to "fill up" the kth queue of output buffer 637. This, in turn, will cause bypassing into the kth output buffer queue to be discouraged; and, the subsequent consumption of the capacity of the kth multidimensional queue.

The scheduler 642 may be designed, for example, to allow a certain number of bytes to be released from each queue per unit of time; which, in turn, establishes the service rate provided to each of the K queues. The scheduler addresses the output buffer 637 through address bus 639 in order to cause the release of a proper amount of data; and, also provides notice to the QTFM 641 of its activity (through notice line 644) so that the QTFM 641 can update status tables 643 to reflect how much data remains in each output buffer queue.

The QTFM also updates its tables with respect to the multidimensional queues in a similar manner each time a packet is written to or read from a multidimensional queue.

Figure 7:
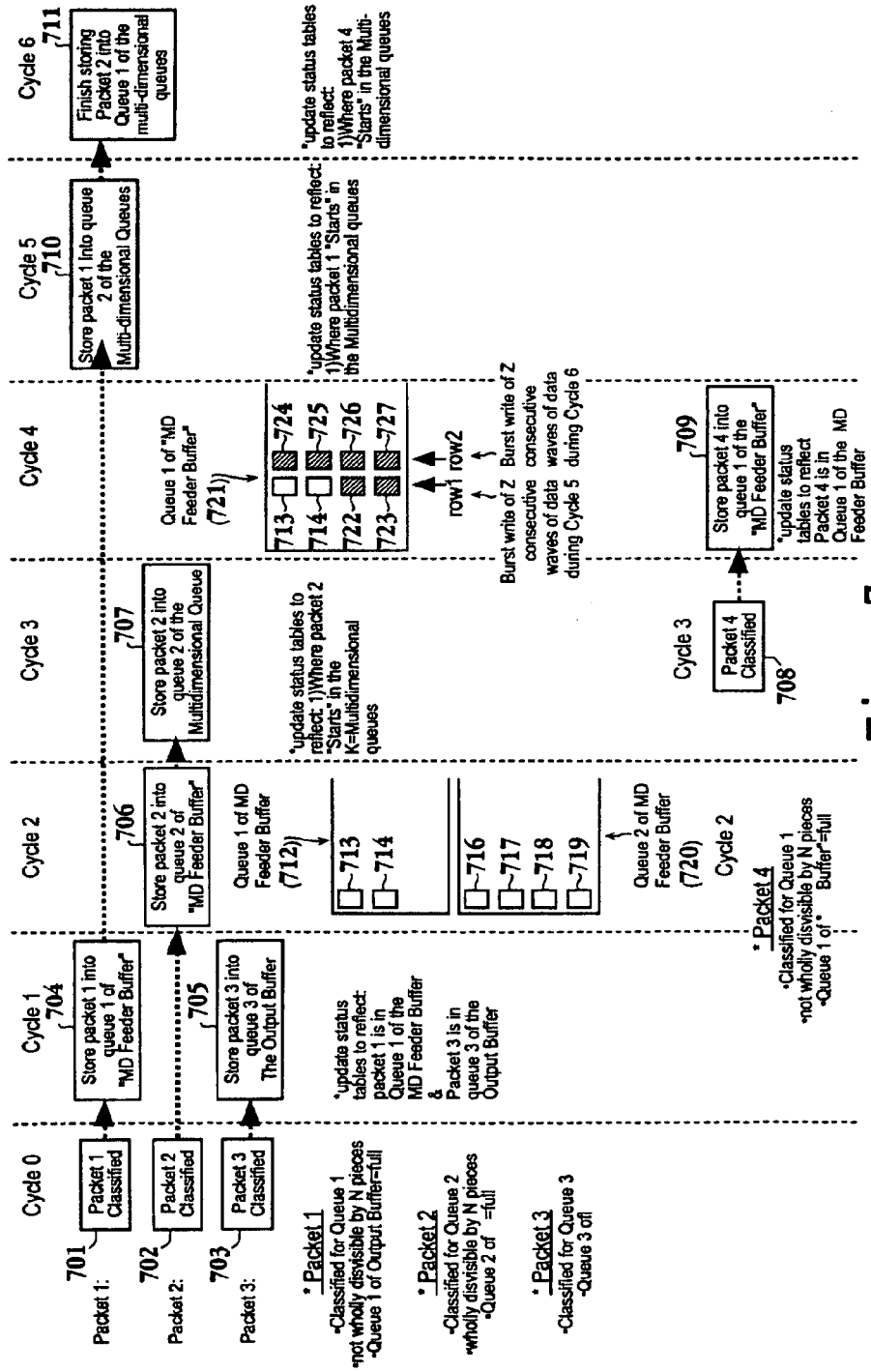
FIG. 7 shows an example of various ways in which the circuit design of FIG. 6 can process a plurality of packets.

FIG. 7 shows a depiction of how packets may be managed by the QTFM 641 of FIG. 6. During cycle 0, three packets have been classified and await removal from their respective input buffer. For simplicity, one may assume different input buffers are used to store each packet (e.g., input buffer 627, stores Packet_1, input buffer 627$_2$ stores Packet_2, and input buffer 627$_3$ stores Packet_3). According to FIG. 7, note that: 1) Packet_1 is classified 701 for queue k=1 out of the K available queues; 2) Packet_2 is classified 702 for queue k=2 out of the K available queues; and 3) Packet_3 is classified 703 for queue k=3 out of the K available queues.

Furthermore, note that: 1) queue 1 of the output buffer 637 is "full"; 2) queue 2 of the output buffer 637 is "full"; and, 3) queue 3 of the output buffer is "empty". As such, bypassing the multidimensional queues is inappropriate for packets 1 and 2; but, is appropriate for packet 3. As such, during cycle 1, Packet 1 is transferred 704 to the MD feeder buffer 636; and Packet 3 is transferred 705 to the output buffer 637. Note that transferal of one packet to the MD feeder buffer 637 may occur simultaneously with the transferal of another packet to the output buffer 637 when different sources (e.g., different input buffers) are involved because different multiplexers are invoked for each packet transferal.

Note the comment that Packet 1 is "not wholly divisible by N pieces". This notification is included to indicate that Packet 1 cannot be segmented, by itself, into an integer number of N pieces. As such, assuming that the k=1 queue is empty within the MD feeder buffer 636, Packet 1 will have to wait before being enqueued into the k=1 multidimensional queue because simultaneously writing N pieces across the full width of data write lines 615$_1$ through 615$_N$ is not possible. A depiction of this instance is shown underneath Cycle 2 wherein a depiction 712 of Packet 1 as stored within the previously empty k=1 queue of the MD feeder buffer 636 is observed.

From this depiction, the size of Packet 1 is sufficient to consume only two pieces 713, 714. One may assume that N=4; and, as such, the size of Packet 1 divided by N corresponds to an amount of data that is coextensive with two pieces (which corresponds to a quotient of 0.5 which is not an integer). Here, the size of each piece may correspond to the amount of data written during a "Y wide" burst write into one of memory units 605$_1$ through 605$_N$. Because the size of Packet 1 only corresponds to 2 pieces and N=4, Packet 1 will have to wait within the MD feeder buffer 636 (until the k=1 queue of the MD feeder buffer 636 is packed with subsequent pieces from a following packet) before Packet 1 can be written into the k=1 multidimensional queue.

During Cycle 2, Packet 2 is transferred 706 from its input buffer 627$_2$ to the MD feeder buffer 636. Note that Packet 2 is labeled as being "wholly divisible by N pieces". As such, Packet 2 can be broken down into an integer number of N pieces. According to the example of FIG. 7, with N=4, a depiction 713 of Packet 2 as stored within the previously empty k=2 queue of the MD feeder buffer 636 is observed. From this depiction, the size of Packet 2 is sufficient to consume four pieces 716 through 719. With N=4, the size of Packet 1 divided by N corresponds to an amount of data that is coextensive with four pieces (which corresponds to a quotient of 1.0 which is an integer).

As such Packet 2 does not need to be packed with a following packet and can be written into the k=2 multidimensional queue at a next available cycle (which is assumed to be Cycle 3). As such, during Cycle 3, Packet 2 is written into 707 the k=2 multidimensional queue (e.g., with a single burst write into each of memory units 605$_1$ through 605$_N$). In response, the status tables are updated to reflect where Packet 2 starts in the k=2 multidimensional queue. Here, assuming that the multidimensional queues have been link listed, the starting point of the packet could have been anywhere within the address space of memory units 605$_1$ through 605$_N$. As such, the starting point of the packet is recorded so that it can be referenced to the network processors 601$_1$ through 601$_N$ when it is time to remove Packet 2 from the k=2 multidimensional queue.

Note also that as of Cycle 3 a fourth packet, Packet 4, is also classified 708. According to the characteristics of Packet 4, Packet 4 (like Packet 1 which is waiting in the MD feeder buffer 636) is characterized for the k=1 queuing path. One may assume that Packet 4 is waiting in input buffer 627$_N$ as of Cycle 3. As such, during Cycle 4, Packet 4 is transferred 709 from its input buffer 627$_N$ to the MD feeder buffer 636. According to the example of FIG. 7, with N=4, a depiction 721 of Packet 4 as stored (along with Packet 1) within the k=2 queue of the MD feeder buffer 636 is observed. Note that Packet 4 is labeled as being "not wholly divisible by N pieces". As such, Packet 4 cannot be broken down into an integer number of N pieces.

From the depiction 721, the size of Packet 4 is sufficient to consume six pieces 722 through 727. With N=4, the size of Packet 4 divided by N corresponds to an amount of data that is coextensive with six pieces (which corresponds to a quotient of 1.5 which is not an integer). Nevertheless, the packing of Packet 4 along with Packet 1 is sufficient to form N pieces worth of information that can be written in parallel across each of data lines 615$_1$ through 615$_N$. As such, by the end of Cycle 3, Packet 1 may be written in a next available cycle (which can be assumed to be).

The status tables 643 are also updated to reflect that Packet 4 has been transferred into the MD feeder buffer 636. Based upon an understanding of the size of Packets 1 and 4, the QTFM 641 will be able to realize that enough data exists in queue 1 of the MD feeder buffer to write not only Packet 1 but also Packet 4 into queue 1 of the multidimensional queues (because the last piece of Packet 4 completes a second "row" of N pieces allowing for a second burst write into the second multidimensional queue).

As such, during Cycle 5, the first "row" of pieces 713, 714, 722 and 723 are simultaneously written 710 into each of the memory units used to implement the multidimensional queues; and, during Cycle 6, the second "row" of pieces 724, 725, 726, 727$_2$ are simultaneously written 711 into each of the memory units used to implement the multidimensional queues. Again, each of these rows may be written with a series of burst writes into the memory units. The status tables are also updated to reflect where Packets 1 and 4 are stored within the multidimensional queues.

Figure 8:
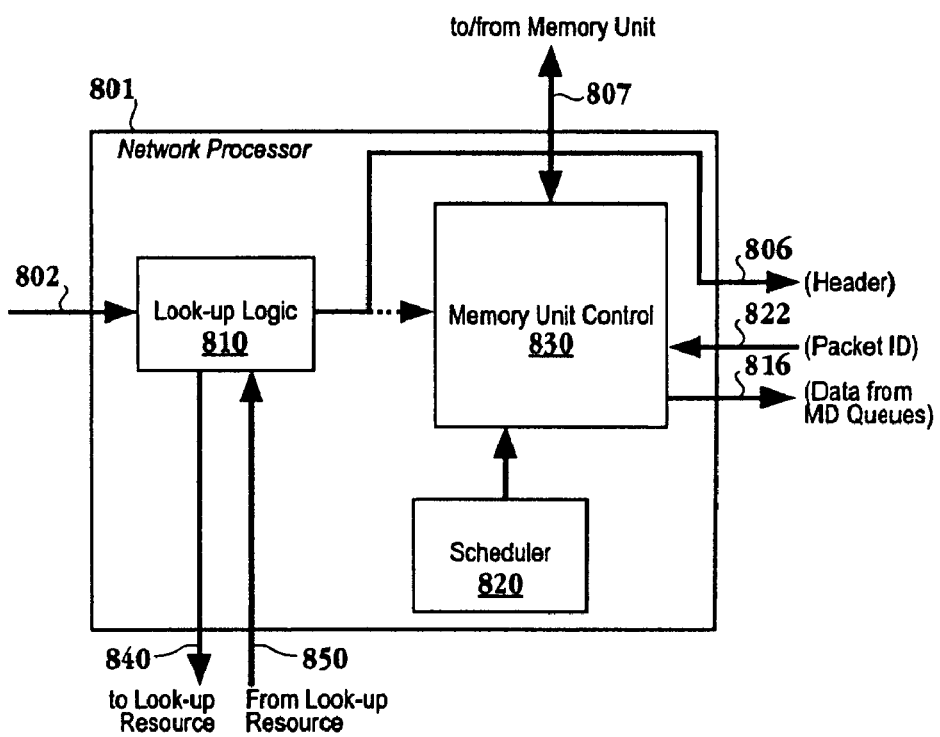
FIG. 8 shows an embodiment of a network processor.

To the extent that network processors have been referred to in the above, FIG. 8 shows a depiction of a possible network processor. It is important to point out that other network processors having architectures different than that observed in FIG. 8 are possible. As such, the term "network processor" should not be construed as being automatically limited to the architecture observed in FIG. 8. Here, as discussed in the background, network processors may be used to perform packet classification as well as assist in the management and/or implementation of a number of queues.

Accordingly, the exemplary network processor architecture 801 of FIG. 8 includes look-up logic 810 that creates a search key from a header information unit that is received at input 802. The search key is provided to the look-up resource at look-up output 840 and the response to the look up (e.g., the packet classification) is received at input 850. Header information (along with the packet classification) may be observed at output 806 and/or provided to a memory control unit 830 that can read from and/or write to a memory unit (along memory unit interface 807).

The memory control unit 830 may also receive at a Packet ID input 822 an indication of a desired packet (e.g., a pointer to a memory location) that is stored in the memory unit (so that the memory control unit 830 can retrieve it). In response to a Packet ID value, the memory controller 830 may fetch the desired packet and present it at output 816. Alternatively or in combination, input 822 (or another input not shown in FIG. 8) may be used to receive a packet so that it can be stored into the memory unit by the memory control unit 830. Network processors may also include their own scheduler 820 that may be used to time the appropriate release of packets from the memory unit.

Note also that embodiments of the present description may be implemented not only within a semiconductor chip but also within machine readable media. For example, the designs discussed above may be stored upon and/or embedded within machine readable media associated with a design tool used for designing semiconductor devices. Examples include a circuit description formatted in the VHSIC Hardware Description Language (VHDL) language, Verilog language or SPICE language. Some circuit description examples include: a behavioral level description, a register transfer level (RTL) description, a gate level netlist and a transistor level netlist. Machine readable media may also include media having layout information such as a GDS-II file. Furthermore, netlist files or other machine readable media for semiconductor chip design may be used in a simulation environment to perform the methods of the teachings described above.

Thus, it is also to be understood that embodiments of this invention may be used as or to support a software program executed upon some form of processing core (such as the Central Processing Unit (CPU) of a computer) or otherwise implemented or realized upon or within a machine readable medium. A machine readable medium includes any mechanism for storing or transmitting information in tangible form readable by a machine (e.g., a computer). For example, a machine readable medium includes read only memory (ROM); random access memory (RAM); magnetic disk storage media; optical storage media; flash memory devices; etc.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method, comprising:
   a) classifying a plurality of packets with a plurality of network processors, each of said network processors classifying a different packet of said plurality of packets by examining look-up information stored in one of a plurality of look-up resources coupled thereto, with the look-up information contained in each of said plurality of look-up resources being the same and with the look-up resource coupled to one of the plurality of network processors differing from the look-up resource coupled to the remaining network processors of the plurality of network processors, the classifying including identification of a queue from amongst a plurality of queues for queuing the different packet;
   b) storing different pieces of the different packet into different memory units, each of said different memory units being managed by corresponding memory controllers, wherein each of said different memory units corresponds to a different dimension of each queue amongst the plurality of queues; and
   c) distributing header information units to the plurality of network processors prior to said classifying, each header information unit comprising header information from one of said plurality of packets.

2. The method of claim 1, wherein memory controller functionality is integrated into the plurality of network processors and wherein a last piece of a first packet and a first piece of a second packet share a same memory unit after said storing resulting in different memory controllers managing the first piece of the second packet and a remainder of the second packet.

3. The method of claim 2 further comprising forming said header information units by slicing payload information from each of said plurality of packets.

4. The method of claim 2 wherein each of said header information units further comprises packet payload information.

5. The method of claim 2 wherein said distributing further comprises distributing in accordance with a round robin scheme.

6. The method of claim 2 wherein said distributing further comprises distributing a header information unit to a network processor only if said network processor indicates it is not busy.

7. The method of claim 1 wherein each of said plurality of packets emanate from a common source.

8. The method of claim 7 wherein each of said plurality of packets flow on the same fiber optic cable.

9. The method of claim 1 wherein said classifying further comprises looking up a queue identifier from a different look-up resource amongst a plurality of look-up resources, each of said look-up resources associated with a different one of said plurality of network processors.

10. The method of claim 9 wherein each of said network processors forms a search key with the distributed header information unit so that said looking up can be performed.

11. The method of claim 1 wherein said different pieces of said packet are simultaneously stored into their corresponding memory unit.

12. The method of claim 1 wherein said network processors write pieces of said packets into their corresponding memory unit.

13. The method of claim 1 wherein said network processors read pieces of said packets from their corresponding memory unit.

14. The method of claim 1 wherein said network processors write and read packet pieces to/from their corresponding memory unit.

15. A method, comprising:
   a) classifying a plurality of packets with a plurality of network processors, each of said network processors classifying a different packet of said plurality of packets by examining look-up information stored in one of a plurality of look-up resources coupled thereto, with the look-up information contained in each of said plurality of look-up resources being the same and with the look-up resource coupled to one of the plurality of network processors differing from the look-up resource coupled to the remaining network processors of the plurality of network processors, the classifying including identification of a queue from amongst a plurality of queues for queuing each packet;

b) storing different pieces of a first packet of said plurality packets into different memory units of a plurality of memory units, each of said different memory units being managed by corresponding memory controllers, wherein each of said different memory units corresponds to a different dimension of each queue amongst the plurality of queues; and c) storing different pieces of a second packet of said plurality of packets into different memory units of said plurality of memory units, wherein a last piece of the first packet and a first piece of the second packet share a same memory unit after said storings, resulting in different memory controllers managing the first piece of the second packet and a remainder of the second packet.

16. The method of claim 15 wherein said classifying results in the same queue identifier for said first and second packets.

17. The method of claim 16 wherein a first network processor of said plurality of network processors classifies said first packet and a second network processor of said plurality of network processors classifies said second packet.

18. The method of claim 15 wherein a first piece of said first packet and the Nth piece of said first packet after said first piece are stored in the same memory unit, wherein, N corresponds to the number of said plurality of network processors.

19. The method of claim 17 wherein at least a portion of said pieces of said first packet are simultaneously stored into said different memory units.

20. The method of claim 17 wherein a first piece of said second packet and the Nth piece of said second packet after said first piece are stored in the same memory unit.

21. The method of claim 15 further comprising removing said first packet from said queue at a time that is consistent with a service rate associated with said queue.

22. The method of claim 15 wherein said first and second packets are associated with different queues amongst a plurality of queues.

23. The method of claim 15 wherein said network processors write pieces of said packets into their corresponding memory unit.

24. The method of claim 15 wherein said network processors read pieces of said packets from their corresponding memory unit.

25. The method of claim 15 wherein said network processors write and read packet pieces to/from their corresponding memory unit.

26. An apparatus, comprising:
a plurality of memory units managed by corresponding memory controllers;
a plurality of queues; and
a plurality of network processors that classify a plurality of packets, each of said network processors classifying a different packet of said plurality of packets by examining look-up information stored in one of a plurality of look-up resources coupled thereto, with the look-up information contained in each of said plurality of look-up resources being the same and with the look-up resource coupled to one of the plurality of network processors differing from the look-up resource coupled to the remaining network processors of the plurality of network processors, the classification including identification of a queue from the plurality of queues for queuing the different packet;
wherein different pieces of the different packet are stored into different memory units, each of said different memory units corresponding to a different dimension of each queue amongst the plurality of queues;
wherein header information units are distributed to the plurality of network processors prior to said classification, each header information unit comprising header information from one of said plurality of packets.

27. The apparatus of claim 26 further comprising a distribution unit that provides the header information units to said plurality of network processors.

28. The apparatus of claim 26 wherein said header information units further comprise payload information.

29. The apparatus of claim 27 wherein said distribution unit slices payload information from said plurality of packets in order to form said header information units.

30. The apparatus of claim 26 wherein each look-up resource unit contains the same packet classification information.

31. The apparatus of claim 26 wherein each of said memory units are dynamic random access memories (DRAMs).

32. The apparatus of claim 26 further comprising a unit that segments said packet into different pieces so that said different pieces may be stored into different dimensions of the multidimensional queue that was identified for said packet.

33. The apparatus of claim 26 wherein said network processors write pieces of said packets into their corresponding memory unit.

34. The apparatus of claim 26 wherein said network processors read pieces of said packets from their corresponding memory unit.

35. The apparatus of claim 26 wherein said network processors write and read packet pieces to/from their corresponding memory unit.

36. A method, comprising:
a) distributing header information units to a plurality of network processors, each header information unit comprising header information from one of a plurality of packets;
b) classifying the plurality of packets with the plurality of network processors, each of said network processors classifying a different packet of said plurality of packets by examining look-up information stored in one of a plurality of look-up resources coupled thereto, with the look-up information contained in each of said plurality of look-up resources being the same and with the look-up resource coupled to one of the plurality of network processors differing from the look-up resource coupled to the remaining network processors of the plurality of network processors, the classifying including identification of a queue from amongst a plurality of queues for queuing the different packet; and
c) storing different pieces of one of said packets into different memory units, each of said different memory units being coupled to a different one of said network processors, wherein a last piece of a first packet and a first piece of a second packet share a same memory unit after being stored resulting in different memory controllers managing the first piece of the second packet and a remainder of the second packet, wherein each of said different memory units corresponds to a different dimension of each queue amongst the plurality of queues.

37. The method of claim 36 further comprising forming said different header information units by slicing payload information from each of said plurality of packets.

38. The method of claim 36 wherein each of said header information units further comprises packet payload information.

39. The method of claim 36 wherein said distributing further comprises distributing in accordance with a round robin scheme.

40. The method of claim 36 wherein said distributing further comprises distributing a header information unit to a network processor only if said network processor indicates it is not busy.

41. The method of claim 36 wherein each of said plurality of packets emanate from a common source.

42. The method of claim 41 wherein each of said plurality of packets flow on the same fiber optic cable.

43. The method of claim 36 wherein said identifying further comprises looking up a queue identifier from a different look-up resource amongst a plurality of look-up resources, each of said look-up resources associated with a different one of said plurality of network processors.

44. The method of claim 43 wherein each of said network processors forms a search key from a different header information unit so that said looking up can be performed.

45. The method of claim 36 wherein said different pieces of said packet are simultaneously stored into their corresponding memory unit.

46. The method of claim 36 wherein said network processors write pieces of said packets into their corresponding memory unit.

47. The method of claim 36 wherein said network processors read pieces of said packets from their corresponding memory unit.

48. The method of claim 36 wherein said network processors write and read packet pieces to/from their corresponding memory unit.

49. An apparatus, comprising:
a plurality of network processors that identify, for each of a plurality of packets, which multidimensional queue from amongst a plurality of multidimensional queues that each one of said plurality of packets should be enqueued into, each of said network processors able to identify a particular multidimensional queue for a different one of said plurality of packets, each of said network processors classifying a different packet of said plurality of packets by examining look-up information stored in one of a plurality of look-up resources coupled thereto, with the look-up information contained in each of said plurality of look-up resources being the same and with the look-up resource coupled to one of the plurality of network processors differing from the look-up resource coupled to the remaining network processors of the plurality of network processors, wherein a last piece of a first packet and a first piece of a second packet share a same memory unit within a multidimensional queue, resulting in different memory controllers managing the first piece of the second packet and a remainder of the second packet, wherein each dimension of the plurality of multidimensional queues corresponds to a different memory controller.

50. The apparatus of claim 49 further comprising a distribution unit that provides header information units to said plurality of network processors.

51. The apparatus of claim 50 wherein said header information units further comprise payload information.

52. The apparatus of claim 50 wherein said distribution unit slices payload information from said plurality of packets in order to form said header information units.

53. The apparatus of claim 49 wherein each look-up resource unit contains the same packet classification information.

54. The apparatus of claim 49 further comprising a unit that segments a first of said packets into different pieces so that said different pieces may be stored into different dimensions of the multidimensional queue that was identified for said packet.

* * * * *

UNITED STATES PATENT AND TRADEMARK OFFICE
CERTIFICATE OF CORRECTION

PATENT NO.      : 7,606,248 B1                                    Page 1 of 1
APPLICATION NO. : 10/144387
DATED           : October 20, 2009
INVENTOR(S)     : Maturi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1030 days.

Signed and Sealed this

Fifth Day of October, 2010

David J. Kappos
*Director of the United States Patent and Trademark Office*